United States Patent
Steen

(10) Patent No.: US 12,226,737 B2
(45) Date of Patent: Feb. 18, 2025

(54) RADIAL-PATH FILTER ELEMENTS, SYSTEMS AND METHODS OF USING SAME

(71) Applicant: EMD Millipore Corporation, Burlington, MA (US)

(72) Inventor: Jonathan Steen, Burlington, MA (US)

(73) Assignee: EMD Millipore Corporation, Burlington, MA (US)

( * ) Notice: Subject to any disclaimer, the term of this patent is extended or adjusted under 35 U.S.C. 154(b) by 185 days.

(21) Appl. No.: 16/096,516

(22) PCT Filed: May 26, 2017

(86) PCT No.: PCT/US2017/034709
§ 371 (c)(1),
(2) Date: Oct. 25, 2018

(87) PCT Pub. No.: WO2017/213892
PCT Pub. Date: Dec. 14, 2017

(65) Prior Publication Data
US 2019/0134569 A1   May 9, 2019

Related U.S. Application Data
(60) Provisional application No. 62/347,780, filed on Jun. 9, 2016.

(51) Int. Cl.
*B01D 63/10* (2006.01)
*B01D 61/02* (2006.01)
(Continued)

(52) U.S. Cl.
CPC ....... *B01D 63/1031* (2022.08); *B01D 61/027* (2013.01); *B01D 61/145* (2013.01);
(Continued)

(58) Field of Classification Search
CPC .............. B01D 63/1031; B01D 61/027; B01D 61/145; B01D 61/147; B01D 63/14;
(Continued)

(56) References Cited

U.S. PATENT DOCUMENTS 3,540,595 A   11/1970   Edwards
3,926,811 A   12/1975   Ramsteck
(Continued)

FOREIGN PATENT DOCUMENTS

CN   1054379 A   9/1991
CN   1274298 A   11/2000
(Continued)

OTHER PUBLICATIONS

Notification of Transmittal of the International Search Report and The Written Opinion of the International Searching Authority, or the Declaration for International Application No. PCT/US2017/034709, "Radial-Path Filter Elements, Systems and Methods of Using Same", date of mailing: Aug. 3, 2017.
(Continued)

*Primary Examiner* — Madeline Gonzalez
(74) *Attorney, Agent, or Firm* — EMD Millipore Corporation

(57) ABSTRACT

The present invention provides a filter element (500) having a radial permeate discharge path (550). The filter element generally includes a closed membrane structure (510) wrapped about a core (530) in reciprocating clockwise and counterclockwise directions, forming semicircular folds of membrane about the core. The semicircular folds of membrane have opposingly situated apical ends (560) separated by a gap. The interior of the closed membrane structure (510) defines a feed channel and the exterior of the closed membrane structure defines at least one permeate channel (522). A radial permeate discharge path (550) extends
(Continued)

through the gap between the apical ends of the semicircular folds of membrane. Systems containing, and methods of using, filter elements including radial permeate discharge paths are also provided.

20 Claims, 14 Drawing Sheets

(51) Int. Cl.
  *B01D 61/14* (2006.01)
  *B01D 63/14* (2006.01)
(52) U.S. Cl.
  CPC ............ *B01D 61/147* (2013.01); *B01D 63/14* (2013.01); *B01D 2313/042* (2022.08); *B01D 2313/086* (2013.01); *B01D 2313/143* (2013.01); *B01D 2313/146* (2013.01); *B01D 2313/23* (2013.01)
(58) Field of Classification Search
  CPC ........ B01D 2313/042; B01D 2313/086; B01D 2313/143; B01D 2313/146; B01D 2313/23
  See application file for complete search history.

(56) References Cited

U.S. PATENT DOCUMENTS

| | | |
|---|---|---|
| 3,931,014 A | 1/1976 | Heimbach et al. |
| 4,028,250 A * | 6/1977 | Loft .................... B01D 63/062 210/259 |
| 4,222,874 A | 9/1980 | Connelly |
| 4,756,835 A | 7/1988 | Wilson |
| 4,765,906 A | 8/1988 | Downing et al. |
| 4,956,085 A | 9/1990 | Kopf |
| D325,070 S | 3/1992 | Kopf |
| 5,114,582 A | 5/1992 | Sandstrom et al. |
| D327,313 S | 6/1992 | Kopf |
| 5,147,542 A | 9/1992 | Proulx |
| 5,310,688 A | 5/1994 | Zale et al. |
| D357,059 S | 4/1995 | Kopf |
| 5,470,468 A | 11/1995 | Colby |
| 5,538,642 A | 7/1996 | Solie |
| 5,599,447 A | 2/1997 | Pearl et al. |
| 5,654,025 A | 8/1997 | Raghunath et al. |
| 5,685,990 A | 11/1997 | Saugmann et al. |
| 6,139,746 A | 10/2000 | Kopf |
| 6,294,090 B1 | 9/2001 | Nussbaumer et al. |
| 6,362,395 B1 | 3/2002 | Poovaiah et al. |
| 6,365,395 B1 | 4/2002 | Antoniou |
| 6,375,848 B1 | 4/2002 | Cote et al. |
| 6,387,270 B1 | 5/2002 | Van |
| 6,402,956 B1 * | 6/2002 | Andou ................ B01D 61/022 210/321.74 |
| 6,596,172 B1 | 7/2003 | Kopf |
| 6,926,833 B2 | 8/2005 | Van |
| 7,101,561 B2 | 9/2006 | Maertens et al. |
| 7,384,549 B2 | 6/2008 | De et al. |
| 7,531,632 B2 | 5/2009 | Perreault |
| 7,682,511 B2 | 3/2010 | De et al. |
| 7,959,805 B2 | 6/2011 | Chisholm et al. |
| 7,967,987 B2 | 6/2011 | De et al. |
| D651,280 S | 12/2011 | Okawa et al. |
| D655,779 S | 3/2012 | Honda et al. |
| D655,780 S | 3/2012 | Honda et al. |
| 8,157,999 B2 | 4/2012 | De et al. |
| 8,231,787 B2 | 7/2012 | Mir et al. |
| 8,506,802 B1 | 8/2013 | De |
| 8,728,315 B2 | 5/2014 | De Los Reyes et al. |
| 8,747,669 B1 | 6/2014 | Bonner et al. |
| D711,500 S | 8/2014 | Marchetti |
| 8,815,583 B2 | 8/2014 | Miller et al. |
| 8,991,027 B2 * | 3/2015 | Jons ..................... B01D 63/10 29/458 |
| D729,897 S | 5/2015 | Ledbetter et al. |
| 9,133,433 B2 | 9/2015 | Vogel et al. |
| D741,983 S | 10/2015 | Mueller et al. |
| D761,381 S | 7/2016 | Natale et al. |
| D762,811 S | 8/2016 | Natale et al. |
| D811,519 S | 2/2018 | Natale et al. |
| 10,195,550 B2 | 2/2019 | Steen et al. |
| 10,207,225 B2 | 2/2019 | Lutz et al. |
| 10,350,518 B2 | 7/2019 | Steen et al. |
| D857,839 S | 8/2019 | Natale et al. |
| 10,399,039 B2 | 9/2019 | Steen |
| 10,550,148 B2 | 2/2020 | Natarajan et al. |
| D912,765 S | 3/2021 | Natale et al. |
| 11,033,839 B2 | 6/2021 | Steen et al. |
| 11,033,939 B2 | 6/2021 | Hengen |
| 11,040,310 B2 | 6/2021 | Lutz et al. |
| 11,278,827 B2 | 3/2022 | Steen et al. |
| 11,617,988 B2 | 4/2023 | Lutz et al. |
| 11,679,349 B2 | 6/2023 | Steen et al. |
| 11,986,772 B2 | 5/2024 | Steen |
| 2002/0170859 A1 | 11/2002 | Kopf |
| 2002/0177693 A1 | 11/2002 | Lebing et al. |
| 2003/0066794 A1 | 4/2003 | Diel |
| 2003/0111402 A1 | 6/2003 | Baig et al. |
| 2004/0167320 A1 | 8/2004 | Couto et al. |
| 2005/0184008 A1 | 8/2005 | Schacht et al. |
| 2005/0197496 A1 | 9/2005 | Perreault |
| 2005/0218057 A1 | 10/2005 | Ngee |
| 2006/0051347 A1 | 3/2006 | Winter |
| 2006/0144788 A1 | 7/2006 | Cath et al. |
| 2006/0219635 A1 | 10/2006 | Mccague et al. |
| 2006/0292672 A1 | 12/2006 | Miller et al. |
| 2007/0138082 A1 | 6/2007 | Connors, Jr. et al. |
| 2007/0151924 A1 | 7/2007 | Mir et al. |
| 2007/0151925 A1 | 7/2007 | De et al. |
| 2007/0173638 A1 | 7/2007 | Buchacher et al. |
| 2007/0246406 A1 | 10/2007 | Dibel et al. |
| 2008/0087594 A1 | 4/2008 | Hermann et al. |
| 2008/0087595 A1 | 4/2008 | Hermann |
| 2008/0135500 A1 | 6/2008 | Gagnon et al. |
| 2008/0190836 A1 | 8/2008 | Beppu et al. |
| 2008/0202242 A1 * | 8/2008 | Mickols ................ B01D 63/10 73/587 |
| 2009/0145838 A1 | 6/2009 | Knappe et al. |
| 2009/0214522 A1 | 8/2009 | Winter |
| 2009/0221047 A1 | 9/2009 | Schindler et al. |
| 2009/0266756 A1 | 10/2009 | Fischer-Fruehholz et al. |
| 2010/0006495 A1 | 1/2010 | Buschmann |
| 2010/0111378 A1 | 5/2010 | Kwan |
| 2010/0192976 A1 | 8/2010 | Lee et al. |
| 2011/0005984 A1 | 1/2011 | Boettcher et al. |
| 2011/0309018 A1 | 12/2011 | Kopf et al. |
| 2012/0077963 A1 | 3/2012 | Hongo et al. |
| 2012/0122076 A1 | 5/2012 | Lau et al. |
| 2012/0160758 A1 * | 6/2012 | Beauchamp ......... B01D 63/103 210/321.74 |
| 2012/0166332 A1 | 6/2012 | Naaman |
| 2012/0168368 A1 | 7/2012 | De et al. |
| 2012/0264948 A1 | 10/2012 | Hilbert et al. |
| 2012/0298578 A1 | 11/2012 | Herrington et al. |
| 2012/0316323 A1 | 12/2012 | Nardini et al. |
| 2013/0037486 A1 | 2/2013 | Sayer et al. |
| 2013/0098829 A1 | 4/2013 | Dontula et al. |
| 2013/0101797 A1 | 4/2013 | Dontula et al. |
| 2013/0146531 A1 | 6/2013 | Tayalia et al. |
| 2013/0334128 A1 | 12/2013 | Takagi et al. |
| 2014/0048483 A1 | 2/2014 | Maeda et al. |
| 2014/0130963 A1 | 5/2014 | Jons et al. |
| 2014/0231331 A1 | 8/2014 | De Los Reyes et al. |
| 2014/0251896 A1 | 9/2014 | Hirozawa et al. |
| 2015/0093800 A1 | 4/2015 | Mahajan et al. |
| 2015/0144560 A1 | 5/2015 | Taniguchi et al. |
| 2015/0360180 A1 | 12/2015 | Lutz et al. |
| 2015/0361129 A1 | 12/2015 | Natarajan et al. |
| 2015/0375173 A1 | 12/2015 | Steen |
| 2016/0059159 A1 | 3/2016 | Steen et al. |
| 2016/0059160 A1 | 3/2016 | Steen et al. |
| 2016/0090514 A1 | 3/2016 | Wang et al. |
| 2017/0056825 A1 | 3/2017 | Schwan et al. |

(56) References Cited

U.S. PATENT DOCUMENTS

| | | | |
|---|---|---|---|
| 2017/0157566 | A1 | 6/2017 | Gefroh et al. |
| 2018/0078903 | A1 | 3/2018 | Hillier |
| 2019/0099702 | A1 | 4/2019 | Steen et al. |
| 2019/0099716 | A1 | 4/2019 | Lutz et al. |
| 2019/0099717 | A1 | 4/2019 | Lutz et al. |
| 2019/0153027 | A1 | 5/2019 | Natarajan et al. |
| 2019/0282937 | A1 | 9/2019 | Steen et al. |
| 2019/0282963 | A1 | 9/2019 | Steen |
| 2020/0246761 | A1* | 8/2020 | Wohlleben ............. B01D 71/82 |
| 2020/0368646 | A1 | 11/2020 | Salbaum et al. |
| 2021/0016520 | A1 | 1/2021 | Mayes et al. |
| 2021/0123551 | A1 | 4/2021 | Kuhn De Chizelle et al. |
| 2022/0176278 | A1 | 6/2022 | Steen et al. |
| 2022/0212146 | A1 | 7/2022 | Steen et al. |
| 2024/0050900 | A1 | 2/2024 | Steen |

FOREIGN PATENT DOCUMENTS

| | | | |
|---|---|---|---|
| CN | 103429308 | A | 12/2013 |
| CN | 105435504 | A * | 3/2016 |
| EP | 0307047 | A1 | 3/1989 |
| EP | 0613724 | A2 | 9/1994 |
| EP | 1029583 | A1 | 8/2000 |
| EP | 1707254 | A1 | 10/2006 |
| EP | 1944076 | A1 | 7/2008 |
| EP | 1974801 | A2 | 10/2008 |
| EP | 2067522 | A1 | 6/2009 |
| EP | 2119492 | A1 | 11/2009 |
| EP | 2682168 | A1 | 1/2014 |
| EP | 2703066 | A1 | 3/2014 |
| EP | 2735357 | A1 | 5/2014 |
| EP | 2957336 | A3 | 3/2016 |
| EP | 3527282 | A1 | 8/2019 |
| JP | S54149384 | | 11/1979 |
| JP | S55109407 | | 8/1980 |
| JP | S55109407 | A * | 8/1980 |
| JP | H01-159006 | A | 6/1989 |
| JP | H0551435 | | 7/1993 |
| JP | 2000-288541 | A | 10/2000 |
| JP | 2001-252543 | A | 9/2001 |
| JP | 2006-247453 | A | 9/2006 |
| JP | 2007-117949 | A | 5/2007 |
| JP | 2008-23415 | A | 2/2008 |
| JP | 2009-178915 | A | 8/2009 |
| JP | 2010-53154 | A | 3/2010 |
| JP | 2013-240765 | A | 12/2013 |
| JP | 5606615 | B1 | 10/2014 |
| JP | 2015-009182 | A | 1/2015 |
| JP | 2015-107467 | A | 6/2015 |
| KR | 300646879 | S | 5/2012 |
| KR | 10-2017-0135567 | A | 12/2017 |
| WO | 91/11249 | A1 | 8/1991 |
| WO | 00/48703 | A1 | 8/2000 |
| WO | 2005/054287 | A1 | 6/2005 |
| WO | 2006/105555 | A1 | 10/2006 |
| WO | 2007/076496 | A2 | 7/2007 |
| WO | 2007/076497 | A2 | 7/2007 |
| WO | 2009/035700 | A2 | 3/2009 |
| WO | 2009/064797 | A2 | 5/2009 |
| WO | 2011/094236 | A2 | 8/2011 |
| WO | 2012/039675 | A1 | 3/2012 |
| WO | 2012/091027 | A1 | 7/2012 |
| WO | 2013/047744 | A1 | 4/2013 |
| WO | 2013/047746 | A1 | 4/2013 |
| WO | 2013085755 | | 6/2013 |
| WO | 2013/106337 | A1 | 7/2013 |
| WO | 2013/125505 | A1 | 8/2013 |
| WO | 2014/067898 | A1 | 5/2014 |
| WO | 2015/133972 | A1 | 9/2015 |
| WO | 2015/195452 | A2 | 12/2015 |
| WO | 2015/195453 | A2 | 12/2015 |
| WO | 2015200691 | | 12/2015 |
| WO | 2016/033546 | A1 | 3/2016 |
| WO | 2016/033553 | A1 | 3/2016 |
| WO | 2017/213892 | A1 | 12/2017 |

OTHER PUBLICATIONS

International Preliminary Report on Patentability received for PCT Application No. PCT/US17/34709 mailed on Dec. 20, 2018, 7 pages.
Extended European Search Report received for European Patent Application No. 19163829.5, mailed on Jul. 24, 2019, 17 pages.
Extended European Search Report received for European Patent Application No. 20167074.2, mailed on Jun. 16, 2020, 18 pages.
International Search Report and Written Opinion received for PCT Patent Application No. PCT/US2015/047585, mailed on Dec. 7, 2015, 9 pages.
Extended European Search Report received for EP Application No. 15172144.6 mailed on Nov. 20, 2015, 20 pages.
Partial European Search Report received for EP Application No. 15172146.1 mailed on Nov. 6, 2015, 8 pages.
Casey et al., "Cadence Single-pass TFF Coupled with Chromatography Steps Enables Continuous Bioprocessing while Reducing Processing Times and Volumes", Retrieved from the internet: URL: www.pall.com/pdfs/Biopharmaceuticals/USD3003_Cadence_SPTFF_ChromSteps_AN.pdf, whole document, Dec. 8, 2015.
Casey et al., "Protein Concentration with Single-Pass Tangential Flow Filtration (SPTFF)", Journal of Membrane Science, Sep. 10, 2011, vol. 384(1) pp. 82-88.
Casey, C. et al., "Cadence™ Single-pass TFF Coupled with Chromatography Steps Enables Continuous BioProcessing while Reducing Processing Times and Volumes", Application Note Jan. 2015, Jan. 2015.
Choo et al., "Membrane fouling mechanisms in the membrane-coupled anaerobic bioreactor", Water Research, vol. 30 No. 8, Aug. 1996, pp. 1771-1780.
Dizon-Maspat et al., "Single Pass Tangential Flow Filtration to Debottleneck Downstream Processing for Therapeutic Antibody Production", Biotechnology and Bioengineering, vol. 109 (4), Nov. 17, 2011, pp. 962-970.
Millipore Bioprocess Division, "Maintenance Procedures Pellicon and Pellicon 2 Cassette Filters", Jul. 1998, 20 pages.
Hu, "Ion Exchange Adsorption and Membrane Filtration Hybrid Process for Protein Mixture Separation", Journal of Chemical Engineering of Japan vol. 39(12), 2006, pp. 1283-1290.
Internet Blog, "Tangential Flow Filtration", Apr. 26, 2006, 3 pages.
Liu et al., "Recovery and Purification Process Development for Monoclonal Antibody Production", MAbs vol. 2 (5), Sep. 1, 2010, pp. 480-499.
Lutz Herb, "Ultrafiltration for Bioprocessing", 2015, pp. 77-94.
Mehta Ushma, "ChromaSorb™ Single-Use Membrane-Based Anion Exchanger", BioProcess International, Available online at: <https://bioprocessintl.com/2009/chromasorb-single-use-membrane-based-anion-exchanger-206589/>, 2009, 2 pages.
Merry A. J. , "Membrane Equipment and Plant Design", Industrial Membrane Separation Technology, 1996, pp. 32-66.
Middlewood et al., "Extraction of Amaranth Starch from an Aqueous Medium using Microfiltration: Membrane Fouling and Cleaning", Journal of Membrane Science, Apr. 12, 2012, pp. 22-29.
Pall Corporation Brochure, "Cadence Single-Pass Tangential Flow Filtration Modules and Systems", 2014.
International Search Report and Written Opinion for PCT Application No. PCT/US2015/035250 mailed on Dec. 14, 2015, 23 pages.
International Search Report and Written Opinion for PCT Application No. PCT/US2015/035251 mailed on Dec. 18, 2015, 15 pages.
International Search Report and Written Opinion for International Application No. PCT/US2015/037780 mailed on Sep. 7, 2015, 12 pages.
International Search Report and Written Opinion for PCT Application No. PCT/US2015/047574 mailed on Dec. 7, 2015, 10 pages.
Pellicon, "Pellicon Single-Pass TFF Cassette Retentate Collection Plate", Available online at: <https://www.emdmillipore.com/US/en/product/Pellicon-Single-Pass-TFF-Cassette-Retentate-Collection-Plate,MM_NF-XXSPTFF03>, 2 pages.
Rathore et al., "Recent Developments in Membrane-Based Separations in Biotechnology Processes: Review", Preparative Biochemistry and Biotechnology, vol. 41 (4), Oct. 2011, pp. 398-421.

(56) References Cited

OTHER PUBLICATIONS

Reis et al., "Linear Scale Ultrafiltration", Biotechnology and Bioengineering, vol. 55 (5), Sep. 1997, pp. 737-746.
Schwartz Larry, "Diafiltration for Desalting or Buffer Exchange", BioProcess International, Available online at: <http://www.bioprocessintl.com/wp-content/uploads/bpi-content/0105ar06_77637a.pdf>, May 2003, 6 pages.
Steen et al., "Single Pass Tangential Flow Filtration", ACS mtg. poster, Anaheim, CA, Mar. 2011.
Teske et al., "Inline Ultrafiltration", Biotechnology Progress, American chemical Society, vol. 26 (4), Mar. 1, 2010, pp. 1068-1072.
Zou et al., "New Technologies for high concentration protein ultrafiltration: High Viscosity TFF Cassettes and Single-Pass TFF", EMD Millipore, Oct. 2014, 1 page.
European Office Action received for Patent Application No. 17728414.8 mailed on Jan. 21, 2022, 4 pages.
Final Office Action received for U.S. Appl. No. 16/259,489 mailed on Mar. 22, 2022, 12 pages.
European Office Action received for Patent Application No. 20167074.2 mailed on Mar. 25, 2022, 4 pages.
Office Action received for Japanese Patent Application No. 2020-081059 mailed on Mar. 29, 2022, 6 Pages (3 Pages of English Translation & 3 Pages of Official Copy).
Appeal Decision received for U.S. Appl. No. 16/207,874, mailed on Jun. 1, 2022, 7 Pages.
Membrane operations, Separation Processes, Retrieved from Internet URL:<https://web.archive.org/web/20041113003913/http://www.separationprocesses.com/Membrane/MT_Chp05j.htm>, Nov. 13, 2004, pp. 1-2.
TFF system improves recovery and increases yield, Pall Corporation, Membrane Technology, vol. 2010, No. 5, May 2010, pp. 2-3.
Final Office Action Received for U.S. Appl. No. 16/259,489, mailing date Apr. 29, 2021, 16 Pages.
Final Office Action Received for U.S. Appl. No. 16/259,489, mailing date Feb. 29, 2024, 15 Pages.
Final Office Action Received for U.S. Appl. No. 16/259,489, mailing date May 16, 2023, 15 Pages.
Non Final Office Action Received for U.S. Appl. No. 16/259,489, mailing date Aug. 21, 2020, 13 Pages.
Non Final Office Action Received for U.S. Appl. No. 16/259,489, mailing date Oct. 26, 2022, 18 Pages.
Non Final Office Action Received for U.S. Appl. No. 16/259,489, mailing date Dec. 9, 2021, 21 Pages.
Non Final Office Action Received for U.S. Appl. No. 16/259,489, mailing date Jul. 26, 2024, 18 Pages.
Non Final Office Action Received for U.S. Appl. No. 17/315,721 mailing date Oct. 14, 2022, 6 Pages.
Final Office Action Received for U.S. Appl. No. 17/656,285, mailing date Mar. 3, 2023, 17 Pages.
Non Final Office Action Received for U.S. Appl. No. 17/656,285, mailing date Oct. 14, 2022, 15 Pages.
Non Final Office Action Received for U.S. Appl. No. 17/682,221, mailing date Aug. 14, 2024, 10 Pages.
Extended European Search Report received for European Patent Application No. 22174654.8 mailing date Aug. 3, 2022, 12 Pages.
Extended European Search Report received for European Patent Application No. 22195919.0 mailing date Dec. 14, 2022, 28 Pages.
Extended European Search Report received for European Patent Application No. 22200930.0, mailing date Feb. 3, 2023, 11 Pages.
International Preliminary Report on Patentability received for PCT Application No. PCT/US2015/035250, mailing date Dec. 29, 2016, 14 Pages.
International Preliminary Report on Patentability received for PCT Application No. PCT/US2015/047574, mailing date Mar. 9, 2017, 8 Pages.
International Preliminary Report on Patentability received for PCT Application No. PCT/US2015/047585 mailing date Mar. 9, 2017, 7 Pages.

\* cited by examiner

US 12,226,737 B2

RADIAL-PATH FILTER ELEMENTS, SYSTEMS AND METHODS OF USING SAME

RELATED APPLICATIONS

This application is the U.S. National Stage of International Application No. PCT/US2017/034709, filed May 26, 2017, which designates the U.S., published in English, and claims the benefit of U.S. Provisional Application No. 62/347,780, filed on Jun. 9, 2016. The entire teachings of the above applications are incorporated herein by reference.

BACKGROUND

Biopharmaceutical manufacturing systems typically included tangential flow filtration (TFF) devices to provide fast and gentle concentration and diafiltration of therapeutic proteins. Common TFF device formats include hollow fiber, tubular, flat plate, and spiral wound formats, as shown by Zeman and Zydney, Microfiltration and Ultrafiltration Principles and Practices, Chapter 6, 1996. Conventional spiral TFF devices contain one or more rectangular permeate membrane envelopes, with the open end originating at the perforated permeate discharge tube, and the free end wound continuously around it to form the nearly circular spiral wound element.

SUMMARY OF THE INVENTION

Filter elements of the present invention include a radial discharge path, which provides for shortened permeate channel lengths as compared to conventional, spiral-wound filter elements. The shortened permeate discharge path can make permeate removal from the filter easier, allowing for lower operating pressures.

Accordingly, in one embodiment, the present invention is directed to a filter element that includes a closed membrane structure wrapped about a core in reciprocating clockwise and counterclockwise directions, forming semicircular folds of membrane about the core. The semicircular folds of membrane have opposingly situated apical ends separated by a gap, the gap defining a radial permeate discharge path. The closed membrane structure has an interior portion defining at least one feed channel and an exterior portion defining at least one permeate channel.

In another embodiment, the invention is directed to a tangential flow filtration (TFF) system that includes a filter element having a radial permeate discharge path.

In yet another embodiment, the invention relates to a method of creating a filter element that includes forming a stack of folded membrane by pleating a closed membrane structure and wrapping the stack of folded membrane about a core, such that the stack of folded membrane forms semicircular folds of membrane about the core. The semicircular folds of membrane have opposingly situated apical ends, such that a gap is provided, which forms a radial permeate discharge path. The method further includes providing at least one feed channel formed from an interior portion of the closed membrane structure.

In a further embodiment, the invention provides a method of filtering a liquid feed that includes providing a filter element having a radial permeate discharge path and introducing a liquid feed to at least one feed channel of the filter element. The liquid feed travels through a flowpath defined by the closed membrane structure and separates into permeate and retentate as it passes through the filter element. The permeate arriving at the radial permeate discharge path, thereby filtering the liquid feed.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Definitions

Figure 1:
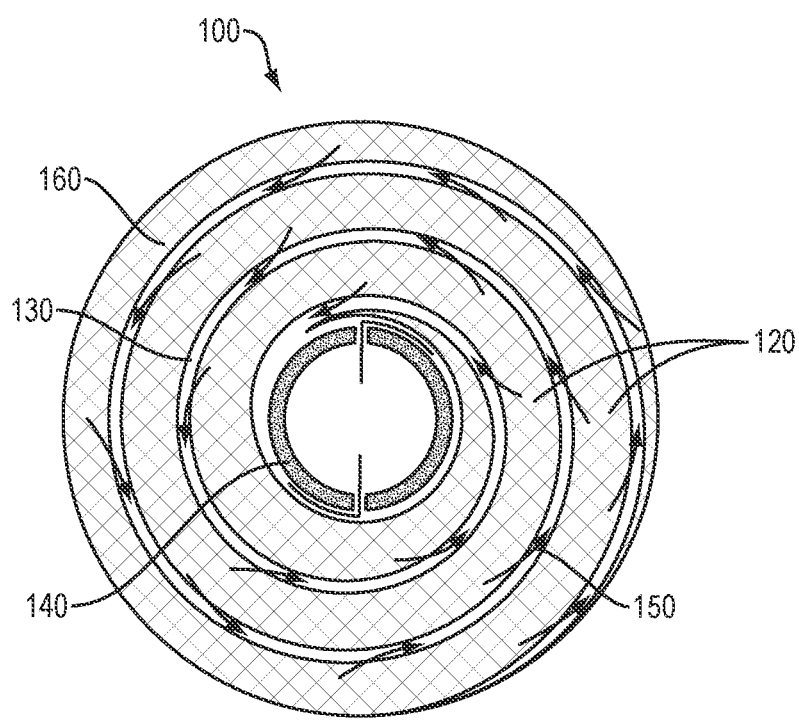
FIG. 1 is a cross-sectional view of a conventional spiral-wound filter element (prior art).

Unless defined otherwise, all technical and scientific terms used herein have the same meaning as commonly understood by one of ordinary skill in the art to which this invention pertains.

As used herein, the singular forms "a", "an," and "the" include plural unless the context clearly dictates otherwise.

The expression "spiral-wound filter element" refers to a filtration membrane that is spirally wound about a core. A spiral-wound filter element may be contained within a housing.

"Single leaf" spirals are spiral-wound filter elements that can be formed with one continuous feed channel. Single-leaf spirals are generally made with one sheet of membrane but can be made with more than one sheet of membrane, such as, for example, two or more sheets of membrane connected in series to form a single leaf.

"Multi-leaf" spirals are spiral-wound filter elements that have multiple feed channels. Multi-leaf spirals are generally made with more than one sheet of membrane, but can be made with one membrane sheet also.

The expression "closed membrane structure" refers to a membrane sheet folded upon itself and joined to itself (for example, having ends sealed together), such that it forms a continuous structure defining an interior space. A closed membrane structure can be, for example, an elongated loop formed from a sheet of membrane, with the backing of the membrane sheet facing outward and the membrane facing inward. A closed membrane structure can also be formed from two or more membrane sheets connected in series to each other and joined to form a continuous and closed structure.

The expression "radial discharge path" refers to a portion of a filter element through which permeate flows in a radial direction. The direction of radial flow is typically inward from a circumference of the filter element toward a core of the filter element. However, the direction of radial flow can also be outward, with flow moving away from the core of the filter element and toward an outlet located at or near a perimeter of the filter element.

"Trans-channel pressure drop" refers to the drop in pressure (e.g., psid) within a feed channel over the length of the filter element. Trans-channel pressure drop can be measured by obtaining the difference between a pressure reading at the inlet end of a feed channel and a pressure reading at the outlet end of the feed channel.

"Trans-membrane pressure drop" is the pressure drop (e.g., psid) normal to the surface of a membrane. Trans-membrane pressure drop (TMP) can be measured by subtracting the permeate pressure from the feed pressure. The observed TMP for a filter module is measured by subtracting the outlet permeate pressure from the sum of the feed pressure and retentate pressure divided by two.

"Flux" is the area-normalized flow rate. Flux can be obtained by measuring the flow volume of a liquid over a given area for a period of time.

"Permeate flux" is the area normalized flow rate of permeate in a permeate channel (e.g., Liters/hr/m$^2$, LMH). Permeate flux is measured by dividing the permeate rate by the TFF device membrane area. The permeate rate can be measured with a flow meter, or by collecting a permeate volume and dividing the volume by a collection time.

"Mass transfer limited flux" is the maximum permeate flux attainable regardless of transmembrane pressure. It is proportional to the mass transfer coefficient, which is often described as the ratio of the solute diffusivity to the boundary layer thickness determined by hydrodynamic conditions in feed channel.

"Cross flow" is the flow rate between inlet and outlet of the feed channel in a filter or a series of filters. Unless otherwise stated, "cross flow" refers to an average cross flow.

The terms "feed," "feed sample" and "feed stream" refer to the solution being introduced into a filtration module for separation.

The term "separation" generally refers to the act of separating the feed sample into two streams, a permeate stream and a retentate stream.

The terms "permeate" and "permeate stream" refer to that portion of the feed that has permeated through the membrane.

The terms "diafiltrate", "diafiltration buffer", and "diafiltrate stream" refer to the solution being used to wash permeate solutes out of the feed stream during a diafiltration process.

The terms "retentate" refers to the portion of the feed that has been retained by the membrane. When referring to a system, filter element, or filter module, "retentate" or "retentate stream" refer to the retentate exiting the system, filter element, or filter module.

"Feed channel" refers to a conduit in a filtration assembly, module or element for a feed.

"Permeate channel" refers to a conduit in a filtration assembly, module, or element for a permeate.

The expression "flow path" refers to a channel comprising a filtration membrane (e.g., ultrafiltration membrane, microfiltration membrane) through which the solution being filtered passes (e.g., in a tangential flow mode). The flow path can have any topology which supports tangential flow (e.g., straight, coiled, arranged in zigzag fashion). A flow path can be open, as in an example of channels formed by hollow fiber membranes, or have one or more flow obstructions, as in the case, for example, of rectangular channels formed by flat-sheet membranes spaced apart by woven or non-woven spacers.

"TFF assembly," "TFF system" and "TFF apparatus" are used interchangeably herein to refer to a tangential flow filtration system that is configured for operation in a single-pass mode and/or a recirculation mode (e.g., full or partial recirculation).

"SPTFF assembly," "SPTFF system" and "SPTFF apparatus" are used interchangeably herein to refer to a TFF system that is configured for operation in a single-pass TFF mode.

"Single-pass mode" and "single pass TFF mode" refer to operating conditions for a TFF system/assembly under which all or a portion of the retentate is not recirculated through the system.

"Filtration membrane" refers to a selectively permeable membrane capable of use in a filtration system, such as a TFF system.

The terms "ultrafiltration membrane" and "UF membrane" are generally defined as a membrane that has pore sizes in the range of between about 1 nanometer to about 100 nanometers, or alternately defined by the "molecular weight cut off" of the membranes, expressed in units of Daltons, and abbreviated as MWCO. In various embodiments, the present invention utilizes ultrafiltration membranes having MWCO ratings in the range from about 1,000 Daltons to a 1,000,000 Daltons.

The term "microfiltration membranes" and "MF membranes" are used herein to refer to membranes that have pore sizes in the range between about 0.1 micrometers to about 10 micrometers.

The term "plurality," refers to two or more of, e.g., a unit, element, or module.

"Fluidly connected" refers to a plurality of filter elements that are connected to one another by one or more conduits for a liquid, such as, a feed channel, retentate channel and/or permeate channel.

"Product" refers to a target species or compound that is to be recovered by processing. Examples of products include fusion proteins, antibodies and antibody fragments, antibody-drug conjugates, albumin, hemoglobin, intravenous immunoglobulin (IVIG), clotting factors, growth factors, hormones, enzymes, antigens, yeast, bacteria, mammalian cells, insect cells, viruses, virus like particles, colloids, juices, polyvinyl alcohol, polyethylene glycol, fruit juice, whey, wine, and beer.

The term "unfiltered feed" refers to feed that includes any product of interest, prior to contact with a filtration membrane. Typically, a product will be a biomolecule (e.g., protein) of interest, such as a monoclonal antibody (mAb) residing in the feed stream.

"Processing" refers to the act of filtering (e.g., by TFF) a feed containing a product of interest and subsequently recovering the product in a concentrated and/or purified form. The concentrated product can be recovered from the filtration system (e.g., a TFF) assembly) in either the retentate stream or permeate stream depending on the product's size and the pore size of the filtration membrane.

A description of example embodiments of the invention follows.

Conventional Filter Elements (Prior Art)

Spiral-wound filter elements are generally known in the art and may be produced in both single-leaf and multi-leaf formats. FIG. 1 shows a cross-sectional view of an example of a conventional single-leaf, spiral-wound filter element 100. The spiral-wound filter element 100 includes membrane layers 160, feed channel components 120 (e.g., feed spacer), and permeate channel components 130 (e.g., permeate spacer) wound about a perforated hollow core permeate collection tube 140. Arrows 150 indicate the flow direction of permeate. The filter membrane layers 160 are in planar contact with outer surfaces of the feed spacer 120. The feed spacer 120 serves as both a mechanical stabilizer for channel geometry and a turbulence promoter for reducing polarization phenomena near the membrane surface. The permeate spacer 130 provides support for the filter membrane layers 160 and maintains a flow channel for the discharge of permeate.

Figure 2A:
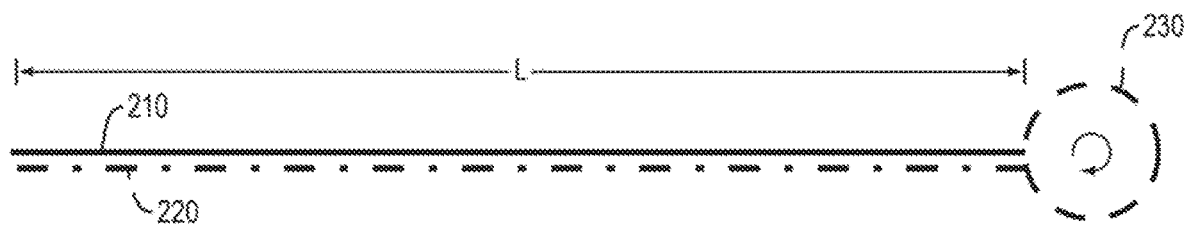
FIG. 2A is a schematic illustrating the assembly of a conventional single-leaf spiral-wound filter element (prior art).
Figure 2B:
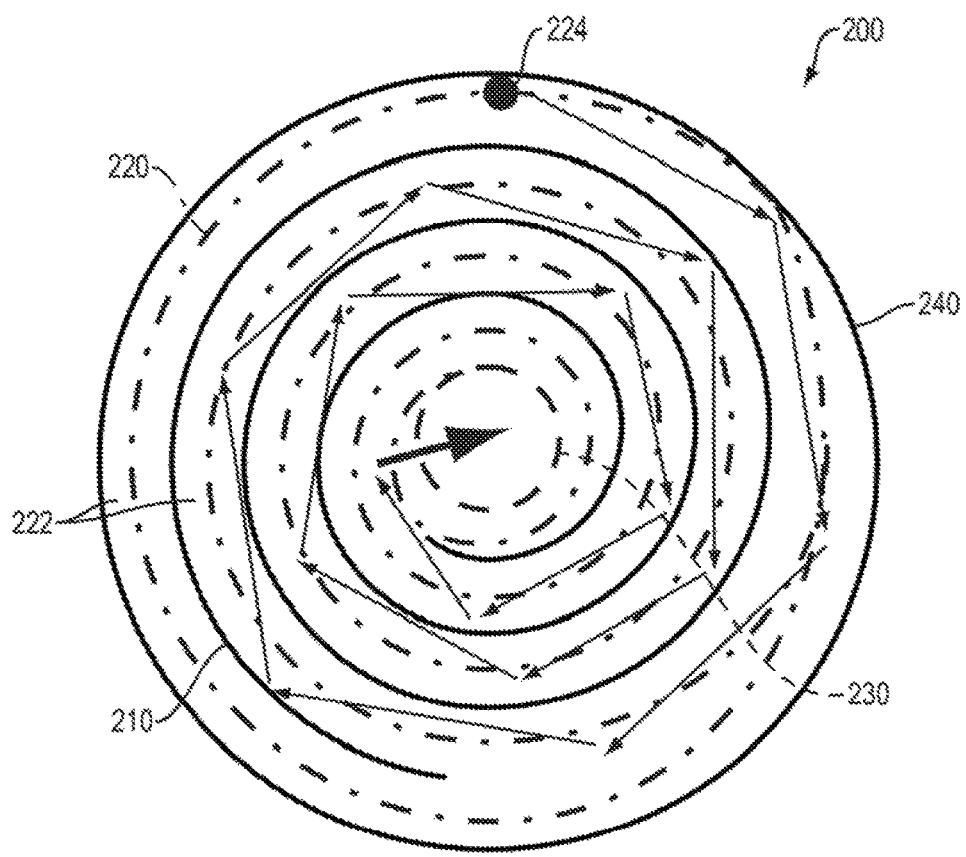
FIG. 2B is a schematic of an assembled single-leaf spiral-wound filter element (prior art).

Spiral-wound filter elements are generally regarded as simple to produce. The assembly of a single-leaf spiral-wound filter element 200 is illustrated in FIGS. 2A and 2B. In FIG. 2A, a membrane leaf 210 having a length L is shown in a flat state and laid over a permeate spacer 220. The membrane leaf 210 and permeate spacer 220 are subsequently wound about a core 230 in, for example, a clockwise direction, as indicated by the curved arrow in FIG. 2A. The filter element 200 is shown in a wound state in FIG. 2B and will typically be bound along an outer perimeter by, for example, glue and placed within a liner or housing 240. A membrane leaf 210 typically comprises a folded membrane sheet with a feed spacer inserted between the folds of membrane. The folded membrane sheet thus defines a feed channel into which feed can be introduced. For simplicity, membrane leaf 210 is represented in FIGS. 2A and 2B as a solid line, with the internal structure not shown. Permeate that has filtered through a membrane sheet is situated in permeate channel 222, which contains an optional permeate spacer 220 (represented by the dotted-dashed line in FIG. 2B). Permeate discharge paths can initiate anywhere along the spiral path formed by the wound membrane leaf 210. For example, a long permeate discharge path, initiating at starting point 224, is represented by the arrows of FIG. 2B. Permeate arriving at starting point 224 travels over a distance commensurate with the length L of the membrane leaf before arriving at core 230, through which it may then exit the filter element 200. Shorter permeate discharge paths (not marked) are also possible.

Figure 3:
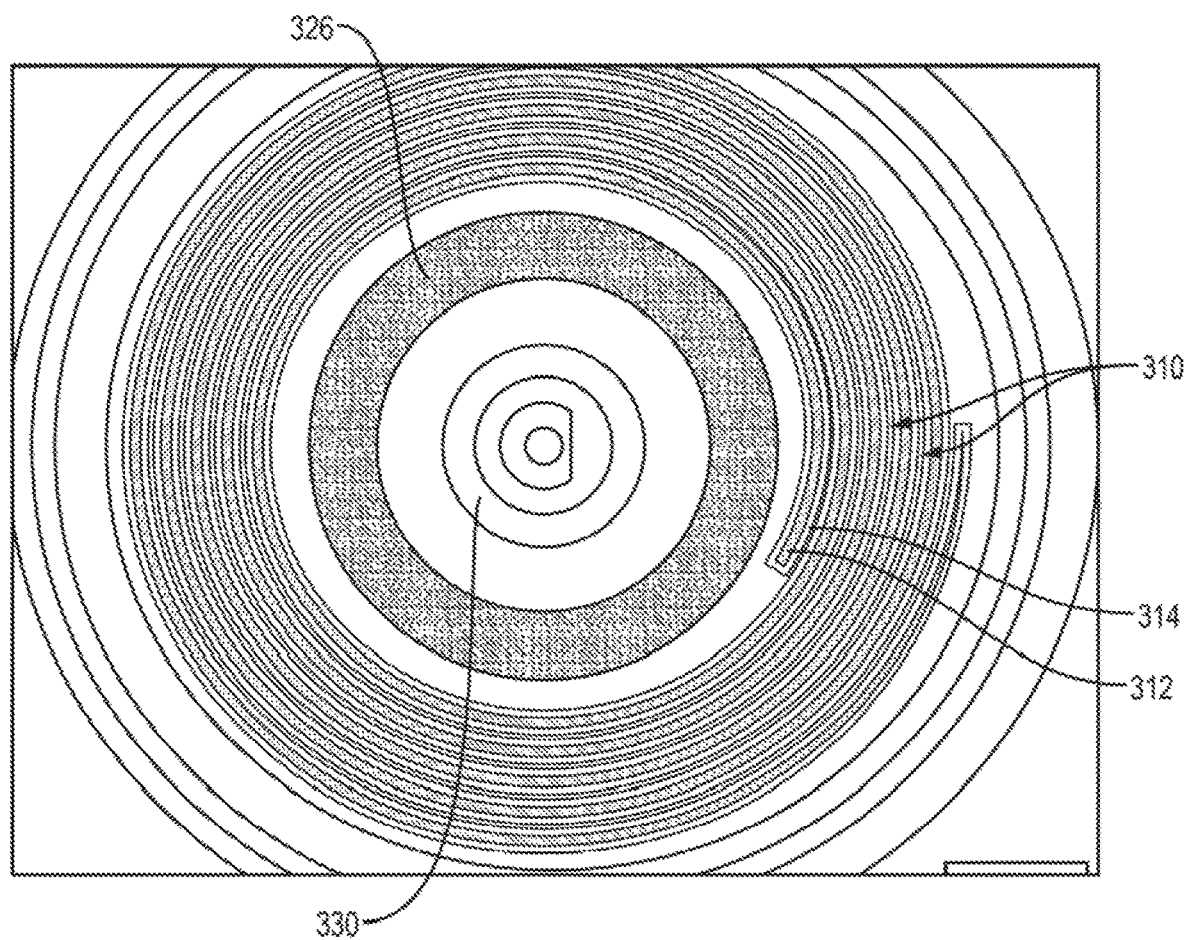
FIG. 3 is an elevational view of an end of a spiral-wound filter element (prior art).

FIG. 3 is an elevational view of an end of a spiral-wound filter element assembled as described above with respect to FIGS. 2A and 2B. A filter element 300 includes a membrane leaf 310 wound about a core 330. Membrane sheet 314, forming membrane leaf 310, and feed channel 312, defined by the spiral layers of membrane sheet 314, are visible. A permeate channel, held open by permeate spacer 320, is also visible. Additional permeate spacer 326 is included about the core 330. The filter element 300 can be located within a liner or housing 340. The permeate core 330 can be, for example, a polysulfone tube with a number of small holes located along the expected width of the permeate envelope open end to allow discharge of permeate from the filter element.

Figure 2C:
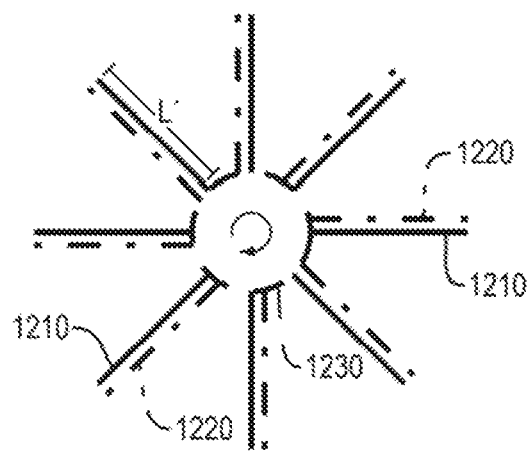
FIG. 2C is a schematic illustrating the assembly of a multi-leaf spiral-wound filter element (prior art).
Figure 2D:
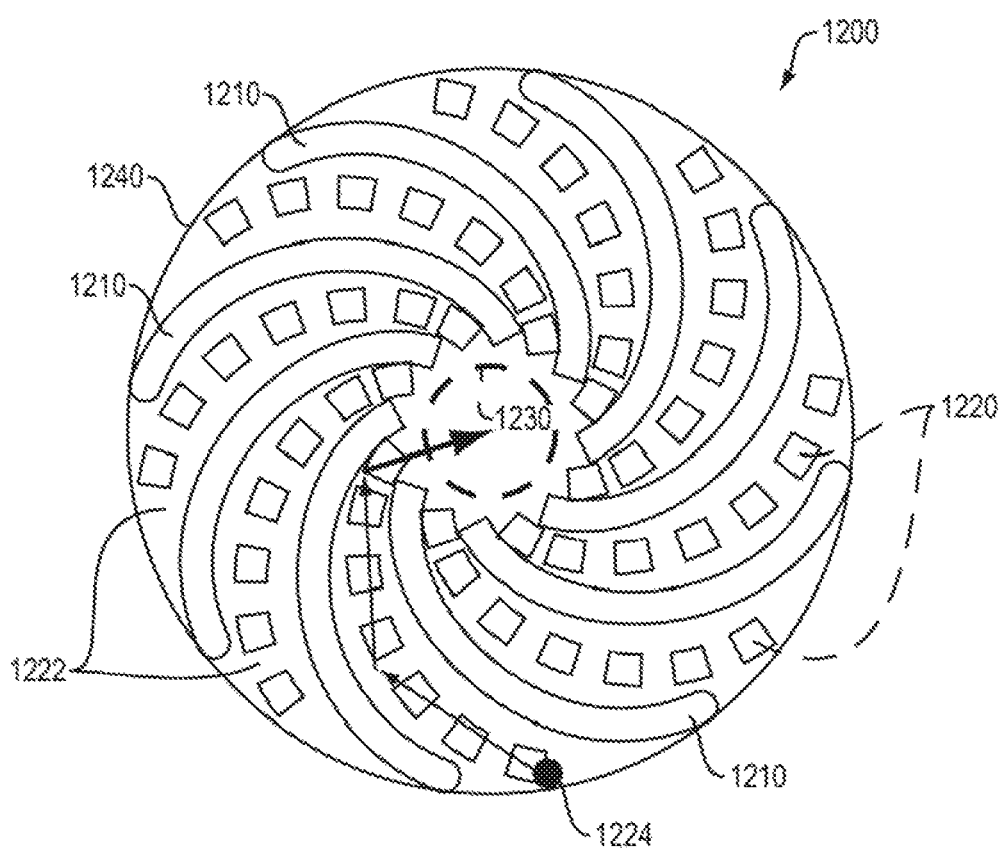
FIG. 2D is a schematic of an assembled multi-leaf spiral-wound filter element (prior art).

Conventional, multi-leaf spiral-wound filter elements are generally more complicated to produce than single-leaf format filter elements. FIGS. 2C and 2D illustrate the assembly of a multi-leaf spiral-wound filter element. In FIG. 2C, the membrane leaves 1210 are shown overlying or underlying permeate spacers 1220. Membrane leaves 1210 have a length L', which would typically be shorter than the length L of membrane leaf 210 (FIG. 2A) for a filter element of the same size. The membrane leaves 1210 and permeate spacers 1220 are shown arranged about a permeate core 1230. The membrane leaves 1210 and, optionally, permeate spacers 1220 can be wound about the core 1230 in, for example, a clockwise direction, as indicated by the curved arrow in FIG. 2C. The filter element 1200 is shown in a wound state in FIG. 2D and, similar to filter element 200 (FIG. 2B), can be bound along an outer perimeter and placed in a liner or housing 1240. Several permeate channels 1222, extending from the outer perimeter toward the permeate core 1230 are contained within the filter element 1200. While spiral-wound filter element 1200 is illustrated in FIGS. 2C and 2D with eight membrane leaves 1210 and eight permeate spacers 1220, more or fewer leaves 1210 and spacers 1220 can be included in a multi-leaf format filter element.

Permeate discharge paths can initiate anywhere along permeate channels 1222. An example of a long permeate discharge path is shown in FIG. 2D, initiating at starting point 1224 and represented by the arrows of FIG. 2D. Permeate arriving at starting point 1224 travels over a distance approximately commensurate with the length L' of the membrane leaf 1210 before arriving at permeate core 1230. FIGS. 2B and 2D illustrate that permeate discharge paths of multi-leaf format spiral-wound filter elements are generally shorter than those in single-leaf format filter elements of the same diameter.

Spiral-wound filter elements are often used in TFF systems, and single-leaf spiral-wound filters are generally preferred for applications requiring small diameter spirals, for example, spiral filters having about a 2" (about 50.8 mm) diameter. Typically, spiral-wound filter elements having diameters of about 1" (about 25.4 mm) to about 4" (about 101.6 mm) are characterized as small-diameter filter elements. Multi-leaf format filter elements are generally preferred for applications requiring larger diameter spirals. Spiral-wound filter elements having diameters greater than about 4" are characterized as large-diameter filter elements. The amount of filtration area of a spiral-wound filter element is provided by the length of the filtration membrane(s) included in the spiral element.

Figure 4:
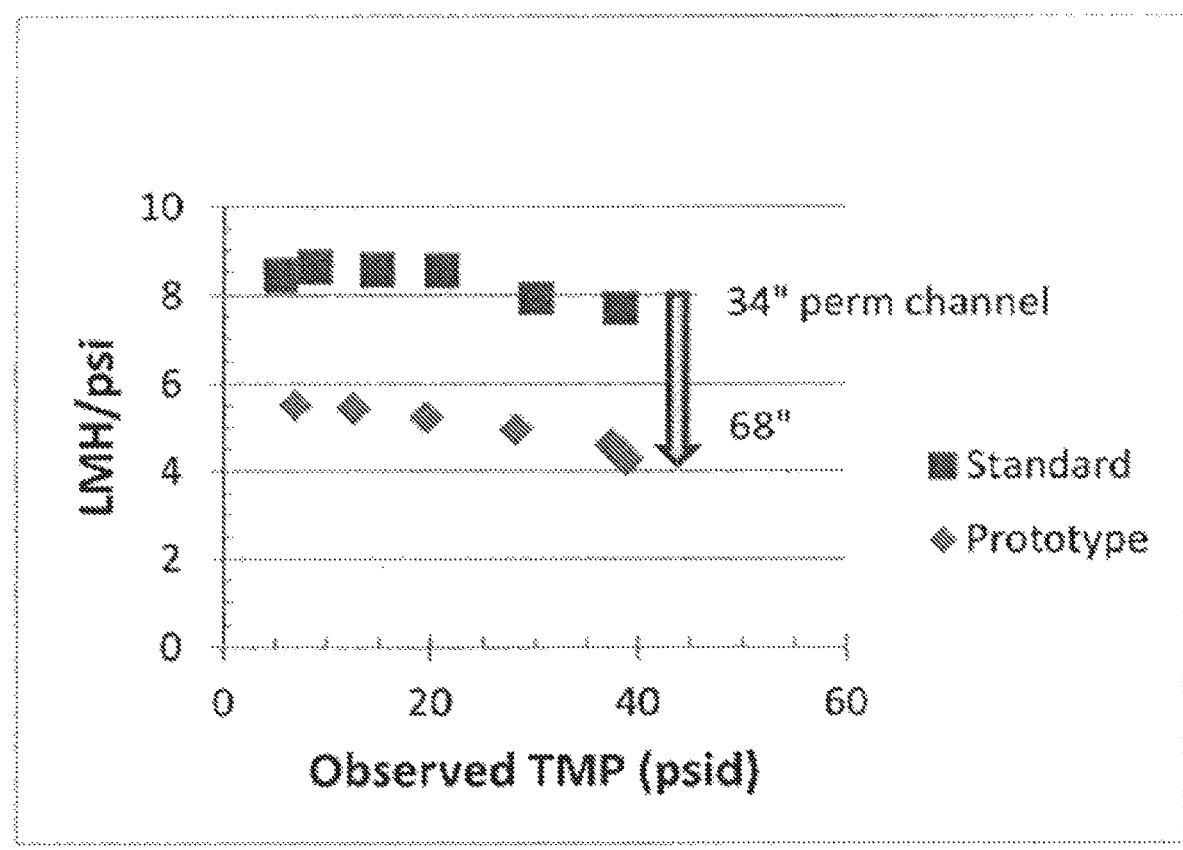
FIG. 4 is a graph of productivity in liters per hour per square meter of membrane (LMH) versus observed transmembrane pressure (TMP) for a conventional spiral-wound filter element with a 34" permeate channel length and a spiral-wound filter element having a longer, 68" permeate channel length.

For certain applications, larger filter elements are required or desired to provide for additional membrane area. However, increasing the length of the membrane leaf in a spiral-wound filter element also increases the length of the permeate discharge path, which has been shown to lower productivity of the filter and can make operating conditions impractical. A water test comparing a standard single-leaf spiral-wound filter element having a 34" permeate channel length with a prototype single-leaf spiral-wound filter element having a 68" permeate channel length is shown in FIG. 4. Productivity, as represented by permeate flux and measured by the liters filtrate per hour per square meter of membrane (LMH), is shown to drop significantly between the standard and prototype spirals. The longer permeate discharge path of the prototype filter element increases resistance to permeate flow as more work, (i.e., force applied over a distance) is required for the permeate to travel through the longer channel, which results in an increased pressed drop. FIG. 4 illustrates pressure-dependent flux, or pressure-dependent productivity. The permeate flux varies along the length of the membrane leaf due to the changing trans-membrane pressure and the lack of retained solids.

For tangential flow filtration (TFF) systems involving, for example, the filtration of macromolecules (e.g., monoclonal antibodies), pressure-independent flux, also referred to as mass transfer limited flux, applies. In such systems, the retentate pressure must be greater than the maximum permeate pressure and must be in a practical range. A practical range for retentate pressure is of about 25 psi or less. In spiral-wound filter elements, the permeate pressure typically quadruples, or more, when the length of a membrane leaf doubles. For example, increasing the membrane leaf length of a 2" diameter spiral-wound membrane (about 0.2 m$^2$) to a an 8" diameter spiral-wound membrane (about 4.5 m$^2$) requires a 22.5-fold increase in leaf length and results in a 506-fold increase in permeate pressure. Such pressures are impractical and create bottlenecks in the filtration process as feed is unable to filter through a membrane due to increased pressure in the permeate channel.

For larger-diameter spiral filter elements, the bottleneck created by increased permeate pressure is typically avoided by incorporating multiple membrane leaves, each of a short length, such as the multi-leaf spiral-wound filter element 1200 shown in FIG. 2D. For example, an 8" diameter spiral filter element may include a single membrane leaf with a length of 750" and would have a permeate discharge distance of approximately the same amount, or 750". Alternatively, an 8" diameter spiral filter element may include thirty membrane leaves, each with a 25" length, creating shorter permeate discharge distances of about 25". Another approach to reducing the bottleneck described above includes pleating a membrane leaf, or leaves, about the core of a filter element. However, such approaches involve more complicated assembly processes that are also more likely to result in defective filter elements.

Thus, while conventional single-leaf spiral-wound filter elements are regarded as simple to produce and are often preferred for use in applications where small-diameter filter elements (e.g., 2" diameter filters) are sufficient, such filter elements can be undesirable for applications where larger filters are required or preferred due to filtrate flow bottlenecks that occur as a result of longer permeate channel lengths. Multi-leaf and pleated membrane filter elements can provide reduced permeate channel lengths as compared to conventional single-leaf filter elements, but are more costly and complicated to produce. Accordingly, there is a need for improved single-leaf filter element geometry resulting in shorter permeate channels that can be used in applications where larger filter elements are required or desired, and that can further be used with existing filtration systems that employ spiral-wound filter elements.

Radial-Path Filter Elements of the Invention

As described herein, the present invention provides for filter elements that include a radial permeate discharge path. Filter elements of the present invention can be formed from a single membrane leaf while creating short permeate discharge paths, thereby avoiding the bottleneck that occurs with conventional single-leaf spiral membrane filters and, further, avoiding the complicated assembly procedures of multi-leaf format filter elements.

Figure 5A:
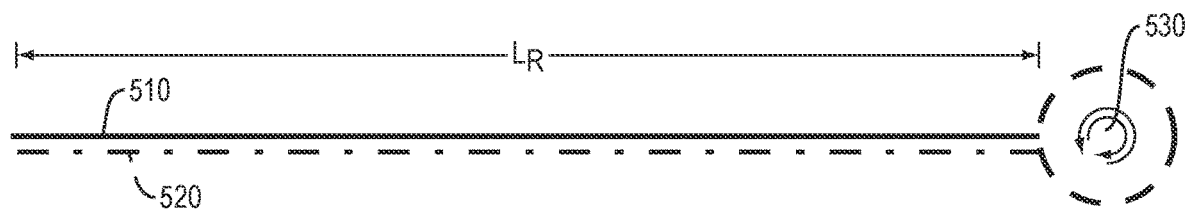
FIG. 5A is a schematic illustrating the assembly of an example filter element of the present invention.
Figure 5B:
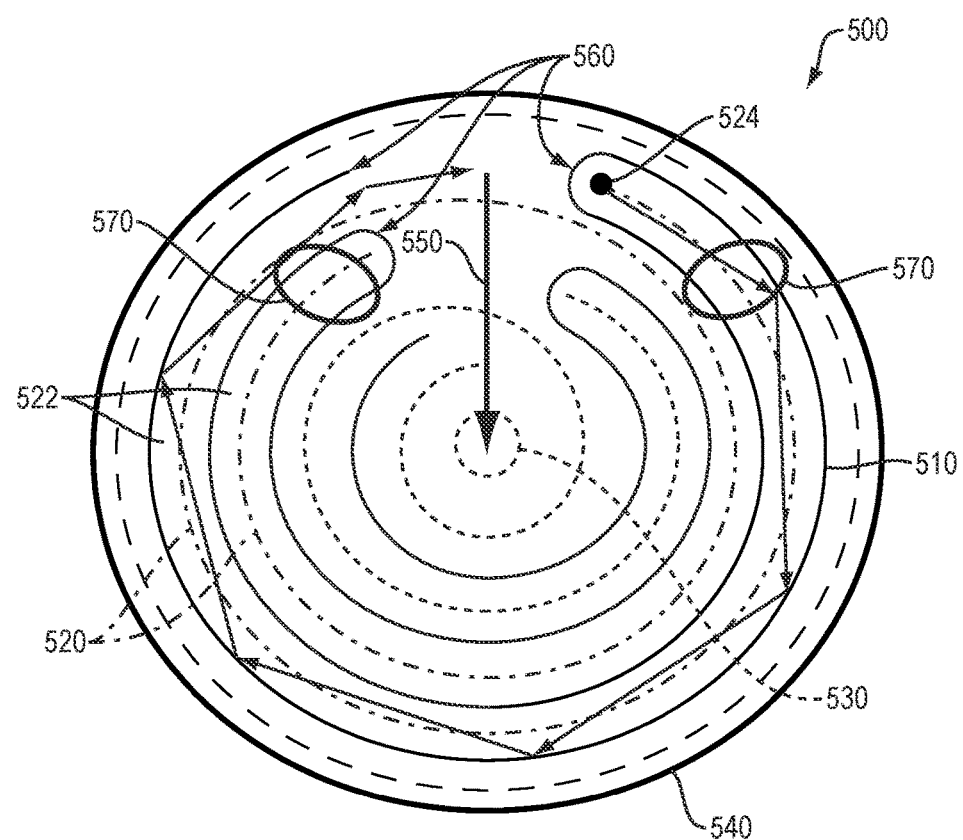
FIG. 5B is a schematic of an example of an assembled radial-path filter element of the present invention.

The assembly of an example radial-path filter element 500 is illustrated in FIGS. 5A and 5B. A membrane leaf 510, having a length $L_R$, is shown in a flat state and laid over a permeate spacer 520. The inclusion of a permeate spacer 520 in a filter element 500 is optional. The membrane leaf 510 and optional permeate spacer 520 are subsequently wound about a core 530 in, for example, alternating clockwise and counter-clockwise directions, as indicated by the curved arrows in FIG. 5A. Alternatively, a stack of pleated membrane leaf 510 and optional permeate spacer 520 can be created by folding the membrane leaf 510 and permeate spacer 520 in a series of layers, as shown in FIG. 5E and described further below. The stack of pleated membrane leaf 510 and permeate spacer 520 can then be wrapped about a core 530. The filter element 500 is shown in a wound state in FIG. 5B. As illustrated in FIG. 5B, filter element 500 includes approximately three semicircular folds 570 of membrane leaf 510, although more or fewer folds can be included depending upon the length of the membrane leaf 510, the desired diameter of the filter element 500, and/or the thicknesses of the membrane leaf 510 and optional permeate spacer 520. The wound membrane leaf 510 has a series of apical ends 560, which are separated by a gap extending from the outer circumference of the filter element to core 530, forming a radial discharge path 550 (represented by the large arrow in FIG. 5B). The filter element 500 can be disposed within a liner or housing 540, similar to the liners and housings for spiral-wound filter elements. The permeate core 530 can be, for example, a polysulfone tube with a number of small holes to allow discharge of permeate from the filter element.

Figure 5C:
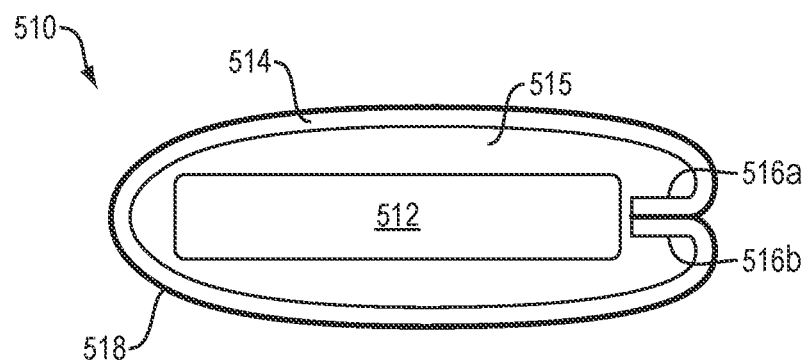
FIG. 5C is a schematic of an example of a closed membrane structure for use with the filter element of FIGS. 5A and 5B.
Figure 5D:
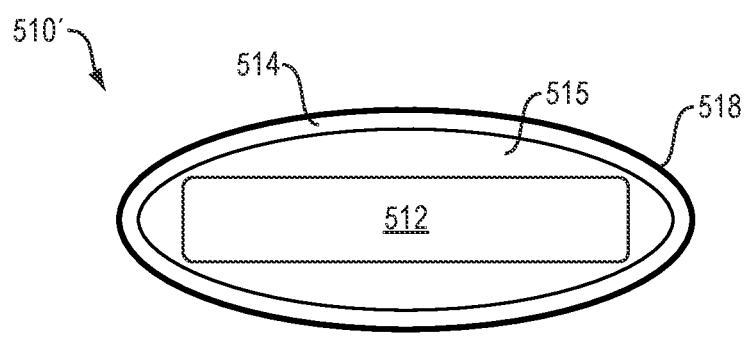
FIG. 5D is a schematic of an alternative, example closed membrane structure for use with the filter element of FIGS. 5A and 5B.
Figure 5E:
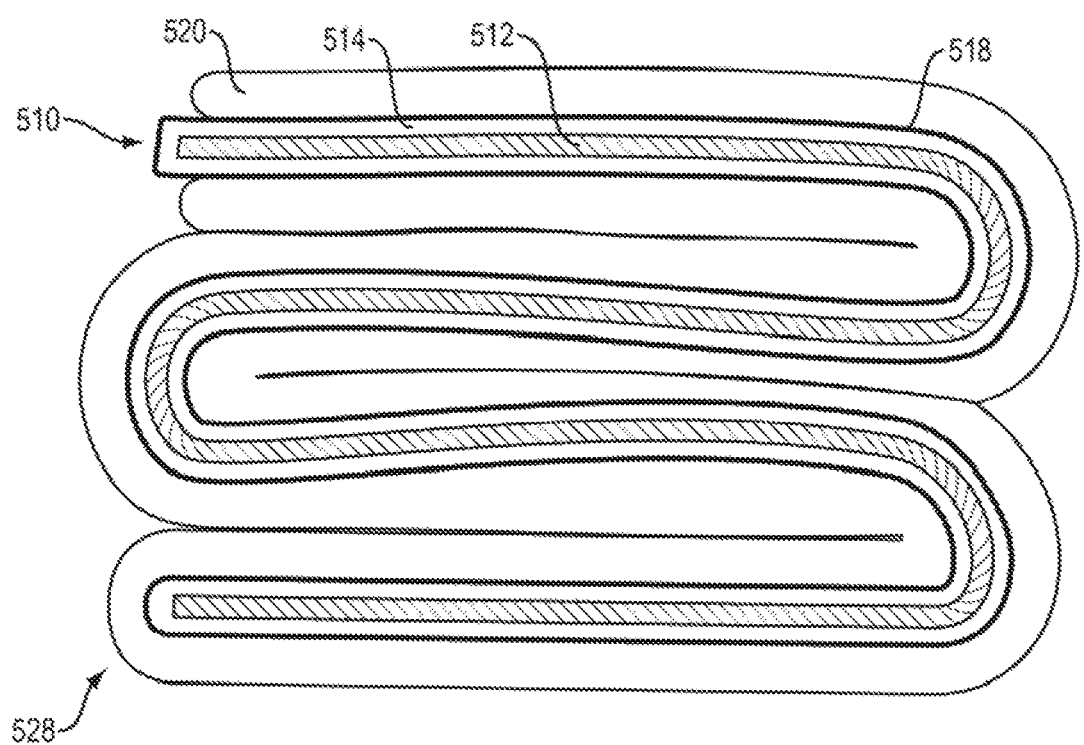
FIG. 5E is a schematic of an example of a folded closed membrane structure and permeate screen for use with the filter element of FIGS. 5A and 5B.

In one embodiment, the membrane leaf 510 is a closed membrane structure, as illustrated in FIG. 5C. Closed membrane structure 510 includes a membrane sheet 514 having a backing 518 facing an exterior of the closed structure 510. The membrane sheet 514 is sealed to itself at ends 516a and 516b, thus defining an interior portion 515. Alternatively, a closed membrane structure 510' can be formed from an integral loop of membrane, as shown in FIG. 5D. Closed membrane structures 510, 510' can be formed from a single membrane sheet, or multiple membrane sheets arranged in a closed loop. For example, multiple membrane sheets can be sealed or glued together in series to form a single closed membrane structure. The interior portion 515 of closed membrane structure 510, 510' defines a feed channel, and feed can be introduced into the interior portion 515. The closed membrane structure 510, 510' can include an optional feed screen 512 in the interior portion 515.

Closed membrane structures 510, 510' are not shown to scale in FIGS. 5C and 5D. Closed membrane structures 510, 510' can be elongated such that they may be folded in a series of layers, or pleated, as shown in FIG. 5E. As shown in FIG. 5E, permeate spacer 520 is folded over closed membrane structure 510 at end 528 and folded together with the membrane structure 510. Alternative configurations are possible. For example, several permeate spacer sheets can be included in a filter element, with permeate spacer sheets interleaved between some or all layers of the folded membrane structure. Alternatively, one or more permeate spacer sheets can be laid against one or both sides of the closed membrane structure prior to folding/winding. The inclusion of a permeate spacer in filter element 500 is optional. Permeate channels can be formed by space external to the backing 518 of closed membrane structure 510, regardless of whether permeate spacer is included. Permeate spacer can be included to provide support for the layers of wound closed membrane structure 510 and can assist with maintaining a flow channel for the discharge of permeate.

Returning to FIGS. 5A and 5B, for simplicity, closed membrane structure 510 is represented as a solid line, with the internal structure of the membrane leaf 510 not shown. Permeate that has filtered through a membrane sheet is situated in permeate channel 522, which contains an optional permeate spacer 520 (represented by the dashed and dotted-dashed lines in FIG. 5B). Permeate discharge paths can initiate anywhere along the semi-circular paths formed by the wound membrane leaf 510, with permeate eventually arriving at or near the apical ends 560 of the wound membrane leaf 510. The gap between apical ends 560 creates a radial discharge path 550 (represented by the large arrow in FIG. 5B). Upon arriving at the gap between apical ends 560, permeate can then travel through radial discharge path 550 directly to core 530. In an alternative configuration, permeate in the radial path can flow in a direction away from core 530 and towards the outer circumference of the filter element 500, where porting can be provided at the perimeter of the filter element.

Figure 5F:
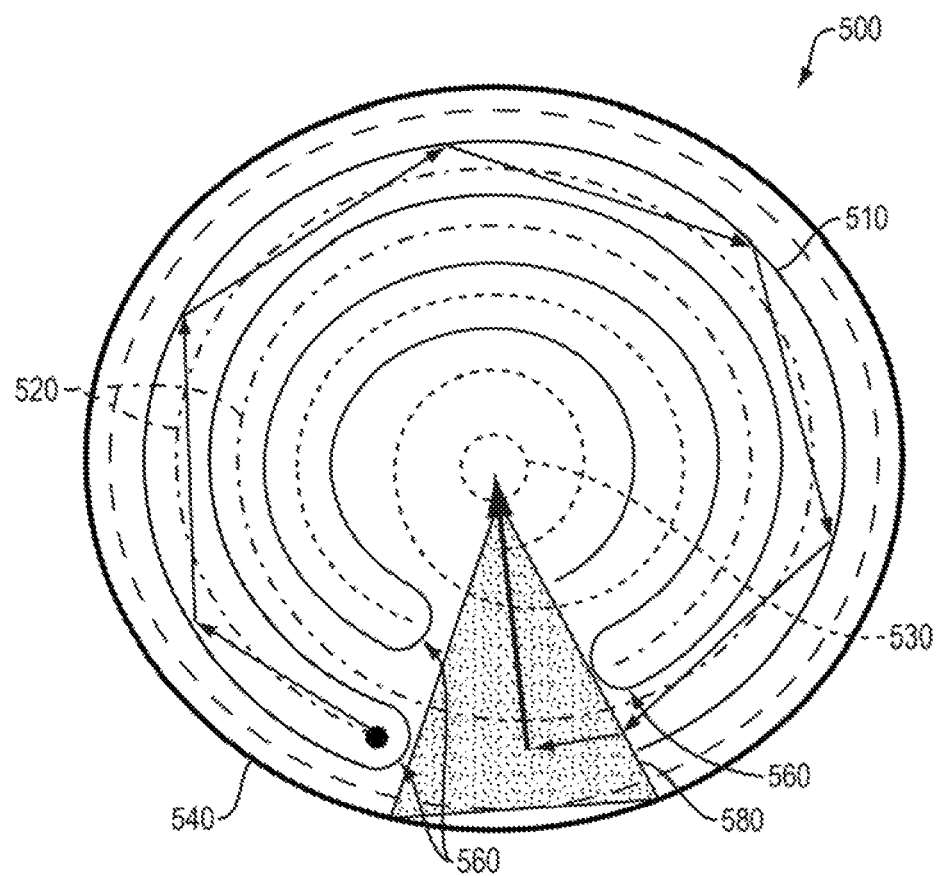
FIG. 5F is a schematic of an example of a radial-path filter element including a radial-path support.

As illustrated in FIG. 5B, the optional permeate spacer 520 is shown extending across the radial discharge path 550, however other configurations are possible. As shown in FIG. 5F, permeate spacer 520 can be included in the filter 500 extending only to the apical ends 560 of the wound membrane leaf 510. Filter 500 can optionally include a radial-path support 580. Radial path support 580 can be a porous or hollow structure having a roughly triangular shape, or other shape configured to fit within the gap forming the radial discharge path 550. Radial path support 580 can provide support to the free and apical ends 560 of the wound membrane leaf 510 against feed-side pressure while allowing permeate to flow into the radial discharge path. Radial path support 580 can extend over the length of the filter element.

Unlike conventional spiral-wound filter elements, radial-path filter element 500 contains several shortened permeate discharge paths, none of which require full rotations around the filter element. The longest permeate discharge path can be the circumference of the wound closed membrane structure plus the radius of the filter element. For example, the longest permeate discharge path of radial-path filter element 500 is represented by arrows in FIG. 5B, initiating at starting point 524. Permeate arriving at starting point 524 travels around a single semi-circular path before arriving the radial discharge path 550. Shorter permeate discharge paths typically occur throughout the element.

Figure 6:
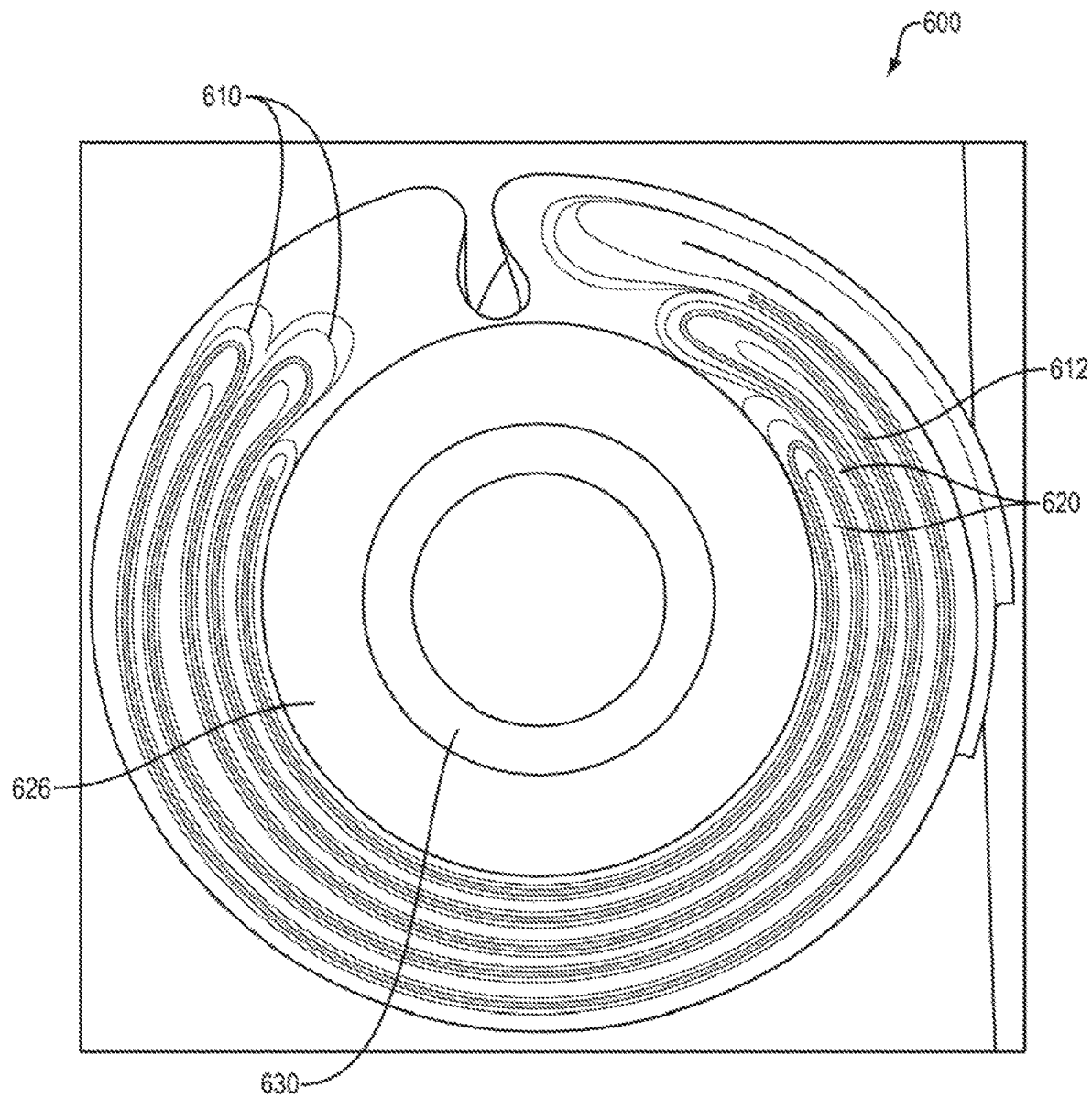
FIG. 6 is an elevational view of an end of an example of a radial-path filter element of the present invention.

FIG. 6 is an elevational view of an end of a radial-path filter element after an initial stage of assembly, as described above with respect to FIGS. 5A-5C. A filter element 600 includes a membrane leaf 610 wound about a core 630 in reciprocating clockwise and counterclockwise directions. Closed membrane structure 610, defining feed channel 612, is visible. A permeate channel, defined by an exterior of closed membrane structure 610 and held open by permeate spacer 620, is also visible. Additional permeate spacer 626 is included about the core 630. As shown in FIG. 6, the filter element 600 also includes sealant 670, which maintains closed membrane structure 610 and permeate spacer 620 in a wound or folded state and seals the permeate channel.

Figure 7:
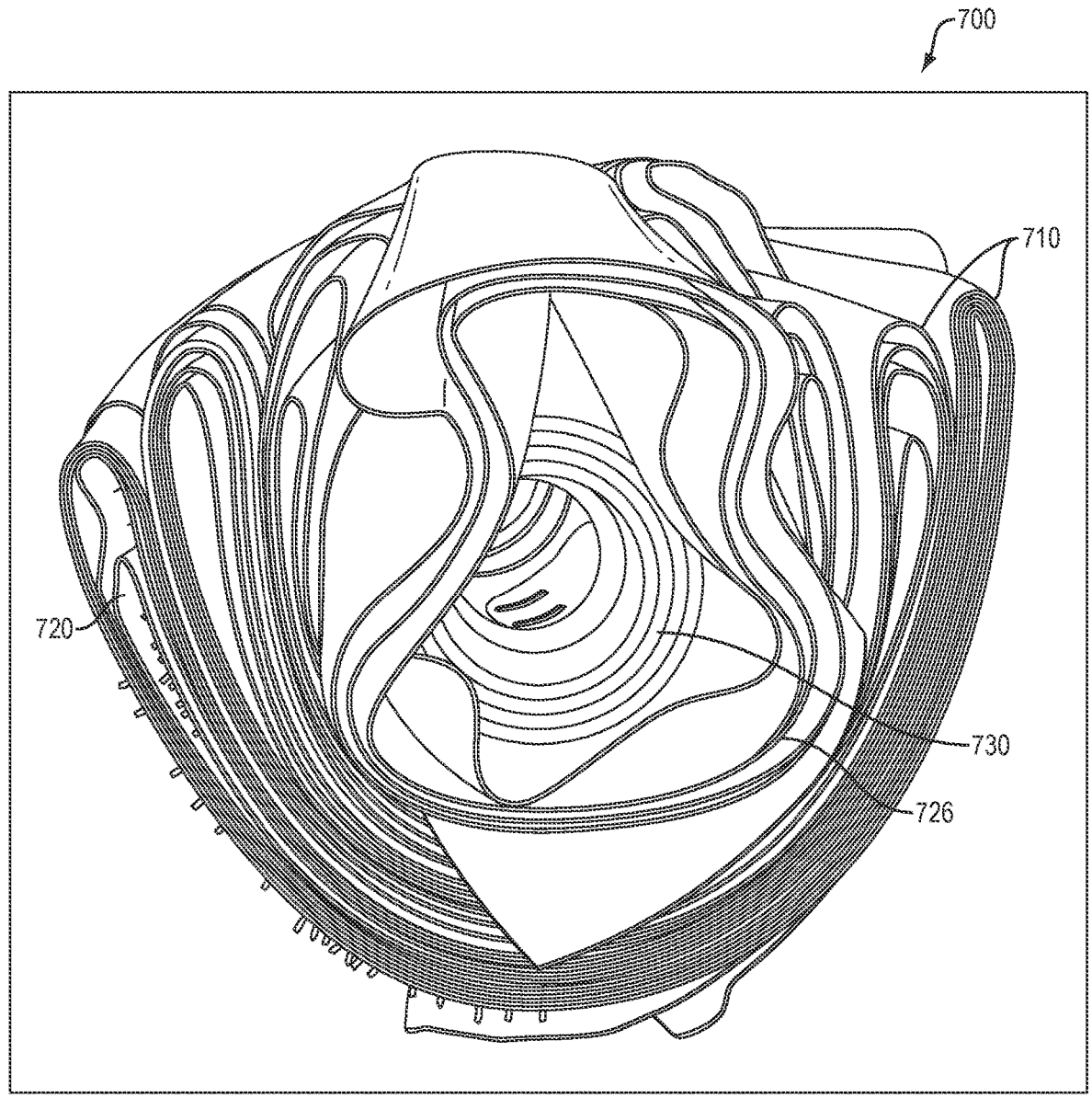
FIG. 7 is an elevational view of an example of a partially-assembled radial-path filter element of the present invention.

FIG. 7 illustrates the initial assembly of a radial-path filter element 700. Folds of closed membrane structure 710 are placed about a core 730. Feed channel spacer 712 is included in an interior portion of the closed membrane structure 710. Permeate spacer 720 is included between the folds of closed membrane structure and additional permeate spacer 726 is included about the core 730.

Figure 8:
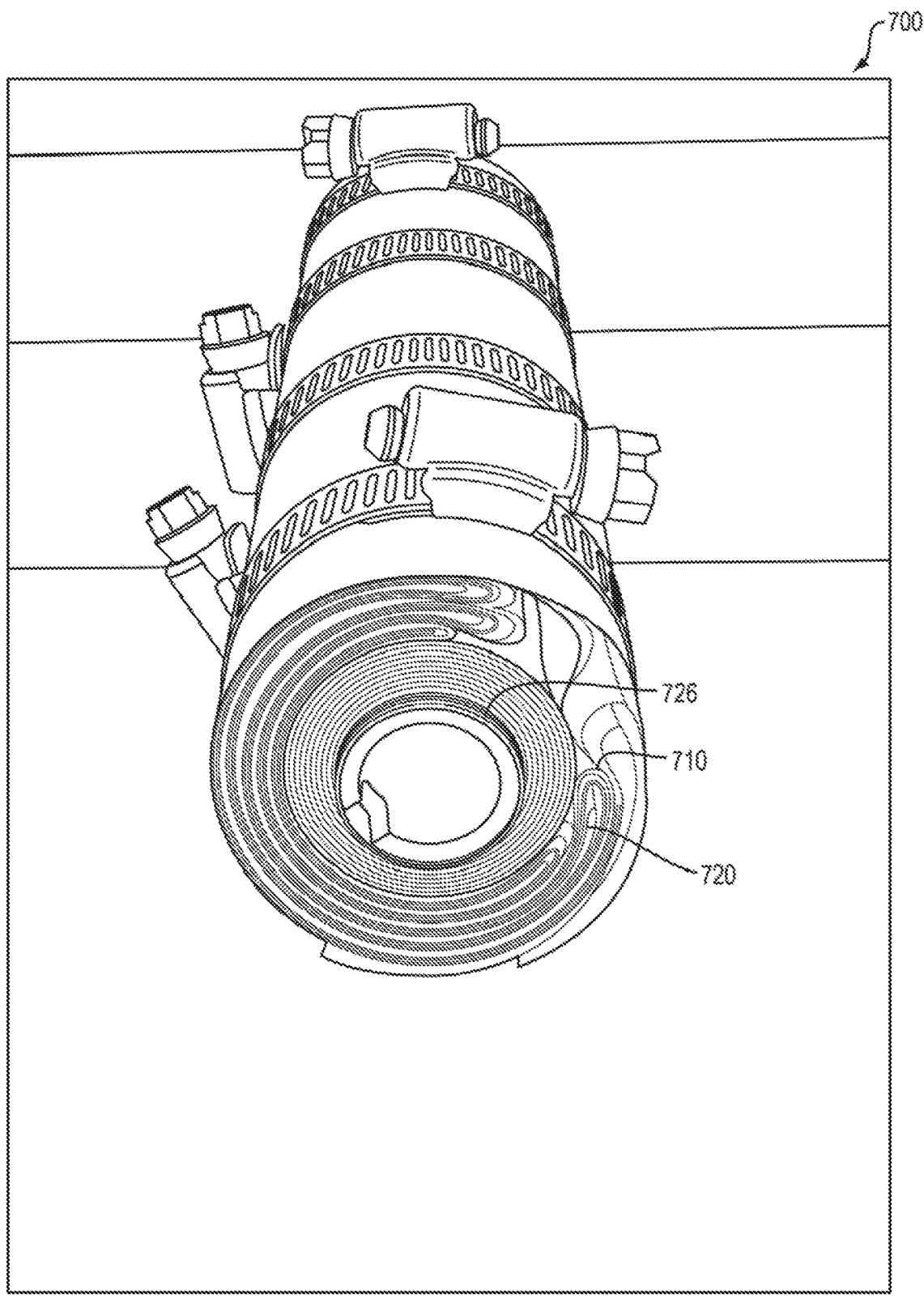
FIG. 8 is an elevational view of the example radial-path filter element of FIG. 6 following gluing and cutting.

FIG. 8 illustrates the further assembly of the radial-path filter element 700. The ends of the closed membrane structure 710 and permeate spacer 720, 726 are cut such that the ends of the filter element are substantially flush. To prevent a liquid feed from entering the permeate channel(s), sealant is applied to the filter element 700.

In one embodiment, a radial-path filter element includes a sealant applied to a first end and a second end of the filter element, the sealant preventing feed that is entering the filter element or retentate that is exiting the filter element from entering the radial permeate discharge path and the at least one permeate channel, for example, by bypassing the membrane. Sealants are known in the art and an appropriate sealant for a particular spiral-wound filter element can be selected by a person of skill in the art. The sealant can be, for example, a urethane, epoxy, glue, tape, or thermoplastic bonding material. The sealant can be capable of being applied without causing damage to other filter elements, such as the membrane and spacer materials, and may further be capable of withstanding sterilization, such as by gamma irradiation or autoclaving. In an embodiment, the sealant is applied during the folding or winding of the closed membrane sheet and, furthermore, is applied in locations where permeate spacer 720 is located. For example, the sealant can be applied to the membrane sheet over a length of about ¼" to about 2", as measured from an end of the filter element, on successive wraps. Application of a sealant on successive wraps can connect the facing layers of membrane backing and the sealant can bridge the permeate screen. The radial discharge path can be sealed by blocking a face of the end of the filter element to prevent glue from entering the feed channel, followed by dipping the end of the filter element in epoxy. During the dipping process, the filter element can be contained in a cylindrical form or mold to maintain the membrane sheet and optional permeate spacer in a folded or wound state. The epoxy can be applied directly into the cylindrical form at the radial path gap through, for example, a side aperture in the form. After the sealant has cured, the ends of the filter element can be trimmed to expose the feed channel(s) that have been filled with glue, while leaving the permeate seams and radial discharge path sealed. The at least one feed channel and the at least one permeate channel in the filter element can be isolated from each other.

Figure 9:
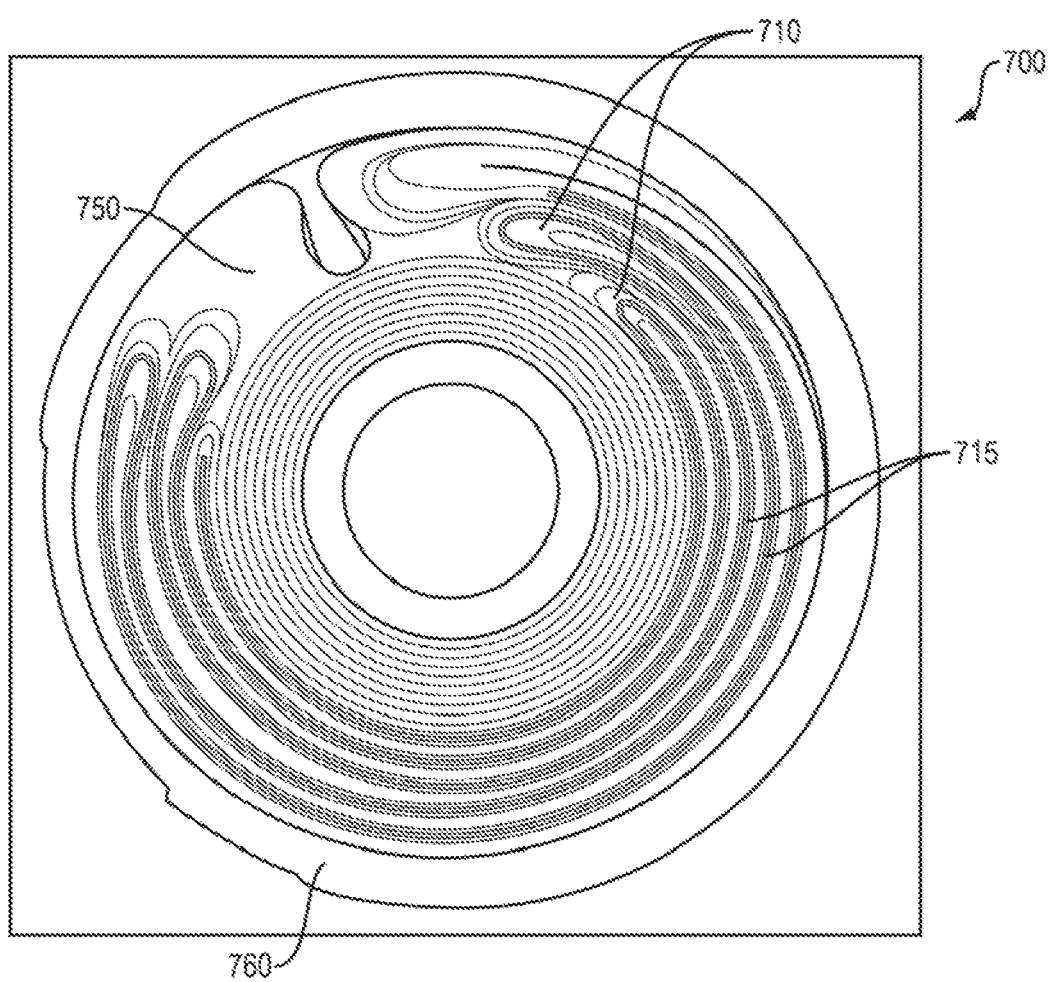
FIG. 9 is an elevational view of an end of an assembled radial-path filter element of FIGS. 7 and 8.

FIG. 9 illustrates the assembled radial-path filter element 700. As shown in FIG. 9, sealant is applied to all permeate channels, including permeate discharge channel 750 and radial discharge path 750. An interior portion 715 of closed membrane structure 710 remains unsealed and defines a feed channel capable of accepting liquid feed. The radial discharge path 750 can optionally contain a structure, such as a porous triangular tube (e.g., radial path support 580 of FIG. 5F) to support the membrane folds while not unduly hindering flow of permeate through the radial discharge path 750. The filter element 700 further includes a strip 760 providing a seal about the perimeter of the filter element and against a housing (not shown) in which the filter element can be placed. The strip 760 can be, for example, a urethane impregnated strip of material (e.g., woven or non-woven screen or spacer material, or other fabric) that is wrapped around the filter element 700.

Filtration membranes that can be used in the radial-path filter elements described herein are known in the art and include, for example, ultrafiltration membranes, microfiltration membranes, reverse-osmosis membranes, and nanofiltration membranes. Such membranes generally have a non-woven backing material or microporous membrane support. Filtration membranes can be formed, for example, from regenerated cellulose, polyarylsulphones, polyvinylidene fluoride (PVDF), polypropylene, polyester, polyethersulfone (PES), polyethylene, polyethersulfone, polysulfone, polyacrylonitrile, nylon, ethylene chlorotrifluoroethylene, polyimide, polyamide, fluoroethylenepropylene, perfluoroalkoxy, polytetrafluorethylene, polyetheretherketone, polysynidilenesulfide, and polycarbonate.

In one embodiment, radial-path filter elements of the present invention include an ultrafiltration membrane. Ultrafiltration membranes can have pore sizes in the range of about 1 nanometer to about 100 nanometers. Particular examples of ultrafiltration membranes include Biomax®-30 membranes and Ultracel®-30 membranes. Biomax®-30 membranes are modified polyethersulfone membranes on non-woven polyolefin backings with nominal molecular weight cutoff of 30 kilodaltons. Ultracel®-30 membranes are regenerated cellulose membranes on high density polyethylene 0.6 µm micro-porous substrates with nominal molecular weight cutoff of 30 kilodaltons.

In another embodiment, radial-path filter elements include a microfiltration membrane. Microfiltration membranes can have pore sizes in the range of about 0.1 micrometers to about 10 micrometers. Particular examples of microfiltration membranes include those made from polyvinylidene fluoride (PVDF), such as, for example, EMD Millipore 0.22 micron Durapore® Pellicon® TFF cassettes P2GVPPV01 or 0.65 micron Durapore® Prostak TFF device PSDVAG021, and those made from polyethersulfone (PES), such as, for example, EMD Millipore Express® membranes in dead end PHF cartridge filter CPGE75TP3.

In an embodiment, a radial-path filter element of the present invention includes a feed spacer (or feed screen) within a feed channel. Feed spacers or screens suitable for use in the present invention include those known in the art. Such feed spacers and screens can include a variety of materials (for example, polyethylene, polypropylene, and polyester) and can have a variety of geometries (for example, extruded bi-planar and woven monofilament mesh polypropylene, in square weave or twill).

In an embodiment, a filter element comprises a permeate spacer. The permeate spacer can be located, for example, within the at least one permeate channel, or within the radial permeate discharge path, or both. Permeate spacers or screens include those known in the art and are typically similar to feed screens in materials and geometries, with the exception of tricot double-knit polyester screens, which can be impregnated with epoxy.

Particular examples of screens that can be used as feed spacers and/or permeate spacers include, for example, a-screens, b-screens, and c-screens (Propyltex® screens, Sefar, QC, Canada). An a-screen is a woven 200 µm (approximate) mono-filament polypropylene diameter fiber screen employing a square twill 2-over-1 right hand weave at 51 strands per inch, having a total nominal weave thickness of 420 µm and open area of about 36%. A b-screen is a woven 150 µm (approximate) mono-filament polypropylene fiber screen employing a square twill 2-over-1 right hand weave at 70 strands per inch and having total nominal weave thickness of 320 µm and open area of about 34%. A c-screen is a woven 250 µm (approximate) mono-filament polypropylene diameter fiber screen employing a square twill 2-over-1 right hand weave at 42 strands per inch and having total nominal weave thickness of 525 µm and open area of about 34%. A particular example of a suitable Tricot screen that can be used as a permeate screen is Hornwood (Lilesville, NC) part number 8324-13, which is 0.009"–0.011" thick and has 58+/−2 courses per inch, 48+/−2 wales per inch, of resin coated polyester fiber. Such Tricot screen fabric is advantageous because it is thin, stiff, and the built-in channels present low flow resistance to discharging permeate transversely through the fabric to the drainage core.

Embodiments of the present invention include radial-path filter elements in a housing (e.g., reusable housing, disposable housing), sleeve, or liner. Radial-path filter elements can be placed in housings in such a way as to enable connection to a filtration system (e.g., a TFF system), contain pressure, and keep feed, retentate, and permeate streams separated. Housings can be stainless steel, plastic, or other suitable material based on considerations such as strength, chemical compatibility, and safety of extractable materials for the intended application. Several individual modules can be connected together in a manifold network. These manifolds provide parallel, series, or mixed flow of feed, retentate, and permeate through the module network.

Radial-path filter elements of the invention can be single-use filter elements, such that they are intended to be disposed of following their initial use. Single-use filters are particularly suitable for applications in the biotechnology industry because single-use filters obviate the need for cleaning, cleaning validation, and validation of the performance of the re-used filter. Furthermore, single-use radial-path filter elements and modules completely eliminate the possibility of cross-contamination, which is an important aspect of pharmaceutical processing.

The shorter permeate discharge paths of radial-path filter elements of the present invention offer several advantages over single-leaf and multi-leaf spiral-wound filters, particularly in applications requiring larger filter elements. As compared to single-leaf spiral-wound filter elements, the shorter permeate discharge paths of radial-path filter elements reduce the pressure level(s) required in constant flux applications, making it more practical for use in such applications. Radial-path filter elements of the present invention also provide higher productivity for small molecule processing, where pressure affects flux, and smaller, more cost-effective filters may be used in such applications. Filter elements of the present invention can alleviate bottlenecks that often occur with spiral-wound filter elements that incorporate single membrane leaves of longer lengths. Filter elements of the present invention can also be simpler to assemble than multi-leaf filter elements.

As compared to conventional multi-leaf spiral-wound filters, radial-path filter elements of the present invention do not require the preparation of multiple membrane leaves, thereby resulting in less labor and higher yield due to less complexity during manufacturing processes. Additionally, as radial-path filter elements can include a single feed screen, there is less exposure of the membrane sheet to cut ends of feed screen, thereby minimizing potential damage to the membrane. Radial-path filter elements can also provide increased membrane utilization as less membrane area is lost during sealing.

Radial-path filter elements may also be more durable than spiral-wound filter elements, even when including long membrane leaves, as the amount of slip between adjacent layers is minimized by the reciprocating clockwise-counterclockwise winding of the membrane leaf about the core. Radial-path filter elements also offer flexibility to wind to different diameters and manufacturing may be more fully automated as rollstock materials may be directly used.

Radial-path filter elements of the present invention can offer similar performance to pleated spiral-wound filter elements, with similar permeate discharge path lengths and similar slip distances between adjacent layers for similar reduced risk of wrinkle formations. However, radial-path filter elements may be more robust as pleated spiral-wound filters include multiple feed screen insertion points, which can lead to more membrane damage.

Filtration Systems Comprising Radial-Path Filter Elements of the Invention

The radial-path filter elements of the present invention are suitable for use in a variety of filtration systems and methods. In a particular embodiment, a radial-path filter element is used in a tangential flow filtration (TFF) system. TFF systems are known in the art. In a particular embodiment, the TFF system can be operated in a single pass mode (SPTFF). In another embodiment, the TFF system is operated in a recirculation mode. The TFF systems can have one or more than one radial-path filter element described herein. In systems having more than one radial-path filter element, the elements can be fluidly connected in series or in parallel, or both.

TFF systems generally provide a flow path and controls to deliver the concentration and diafiltration processes sometimes required to convert feed to a desired intermediate or final product and to recover the product at an acceptable concentration and purity. A TFF device containing a spiral-wound filter module of the present invention will generally include the necessary connections, separation capability, and membrane area to accomplish the tangential flow filtration in the required time.

Figure 10:
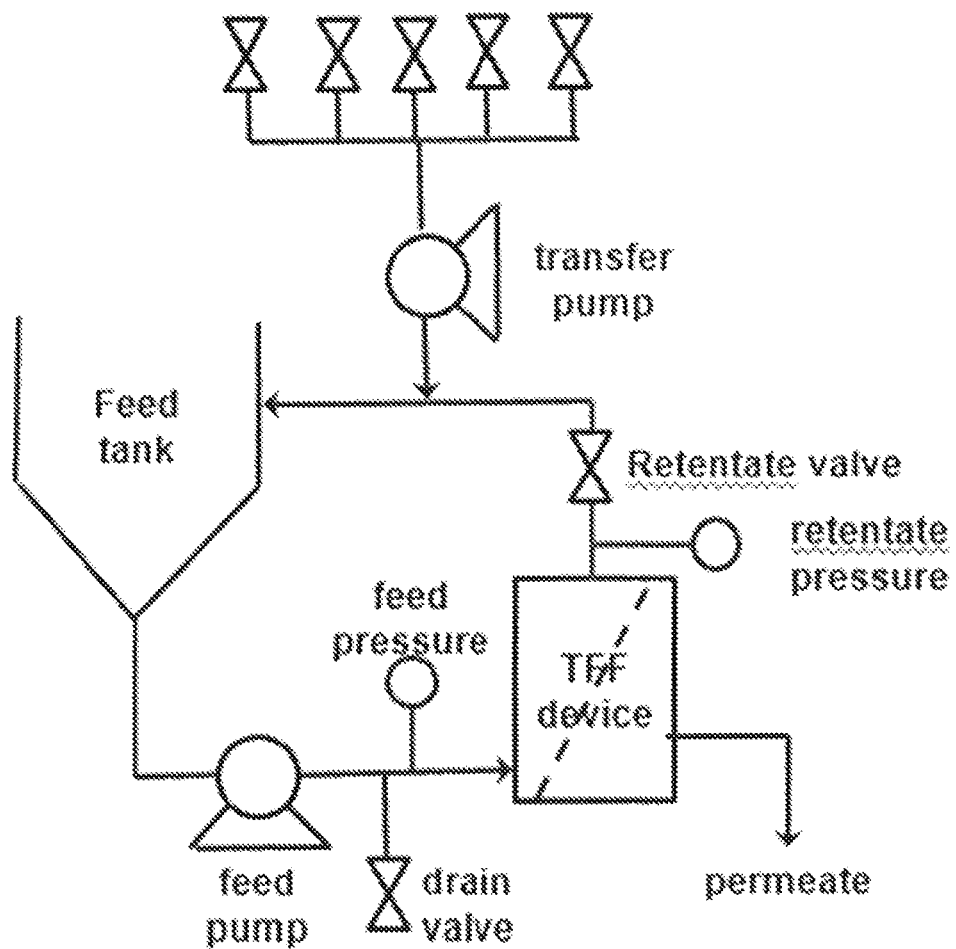
FIG. 10 is a diagram of an example Tangential Flow Filtration (TFF) system.

An example TFF system is shown in FIG. 10. Pressurized feed from the recirculation tank is connected to the feed port of the radial-path filter module or manifold (TFF device). Feed flows through the membrane lined feed channel of the TFF device(s) under an applied trans-channel pressure drop, typically achieved by pressurizing the feed using a pump. Some of the solvent from the feed stream flows through the face of the membrane into the permeate channel and carries with it a portion of the permeable species. The remaining concentrated feed stream flows out of the module or manifold through the retentate port. The permeate flowing from the module's permeate port is directed to a location that is dependent on the process, where it is either retained or discarded.

TFF systems containing radial-path filter elements that are employed in recirculating TFF methods can include at least one pump or control valve for recirculating retentate through all or part of the system and at least one conduit for recirculating (e.g., carrying) retentate. The amount of retentate that is recirculated can be controlled using, for example, a pump or a valve. A flow meter can be used to provide a process value for the pump or valve to control the amount of retentate that is recirculated. Thus, in some embodiments, the TFF systems described herein for use in the partial recirculation TFF methods of the invention can further comprise a valve or pump and/or a flow meter for controlling recirculation of retentate. Preferably, the valve or pump and/or flow meter is positioned on the retentate outlet or flow line carrying retentate out of the system to the retentate receptacle. In an alternative embodiment, filter elements of the present invention can be used for dead-end filtration, where retentate is prevented from exiting the filter element, such as by, for example, closing the retentate discharge outlet.

Maximum achievable flux during TFF system operation is obtained by selection of an adequate transmembrane pressure (TMP) for permeate discharge. This applies to pressure-dependent and mass-transfer-limited regions of operation. For radial-path filters, attainment of the desired TMP is determined by measurement at the end of the module. The transmembrane pressure must be sufficient to support both the pressure drop through the membrane and the maximum pressure to discharge permeate from the permeate channel.

Filtration Processes Employing Radial-Path Filter Elements of the Invention

In one embodiment, the invention relates to a method of filtering a liquid (e.g., a liquid feed), comprising passing a liquid feed through a radial-path filter element of the invention, and separating the liquid feed into permeate and retentate in the filter element. In an embodiment, the method further comprises recovering the permeate and at least a portion of the retentate from the filter element.

In an embodiment, a liquid feed can be any liquid that contains a product of interest, such as a target protein. Target proteins can include, for example, monoclonal antibodies (mAbs), fusion proteins, antibodies and antibody fragments, antibody-drug conjugates, albumin, intravenous immunoglobulin (IVIG), plasma proteins, hormones, enzymes, and antigens. In addition, the feed will generally contain one or more impurities (e.g., non-target proteins). Typically, the liquid feed is obtained from a source of the target protein (e.g., a hybridoma or other host cell expressing an mAb). In a particular embodiment, the target protein in the liquid sample is a monoclonal antibody (mAb) and the non-target proteins are host cell proteins (HCPs) (e.g., proteins from host hybridoma cells). Non-target proteins are generally a heterogeneous mixture of proteins of varying sizes, hydrophobicities and charge densities. The product of interest in a liquid feed can also be a non-protein solution, such as water, from which impurities, such as salts, minerals, metals and the like are to be removed. The product of interest can, alternatively, be a food or beverage item, such as dairy, from which impurities, such as blood, dust, sediments, and other foreign matter is to be removed.

The product can be recovered in either the feed or permeate stream. Feed-side product is typically concentrated by passing solvent through the membrane while the product is retained in the filter element. Poorly retained small molecules in the feed-side solution can be chased through the membrane by a suitable diafiltration solution. Diafiltration can be performed to change the pH, conductivity, buffer composition and/or small molecule population. The yield of permeate-side product can be increased as the volume of permeate increases, either by concentration or diafiltration of the feed.

In one embodiment, the method includes a tangential flow filtration (TFF) process, which can be, e.g., a single-pass TFF (SPTFF) process, a recirculating TFF process or a partial recirculation TFF process. In a particular embodiment, the TFF process is a SPTFF process. In another embodiment, the TFF process is a recirculating TFF process.

In an alternative embodiment, the TFF process is a partial recirculation process. For example, the TFF process can comprise recovering permeate and a portion of the retentate from the system in separate containers without recirculation through the TFF system, and recirculating the remainder of the retentate through the TFF system at least once.

Recirculating all or a portion of the retentate during start up provides a method by which to ensure that system has reached equilibrium and the retentate has achieved the desired concentration prior to collecting it into the product vessel. It also provides a convenient way to respond to system upsets during processing to provide a more robust process. The fraction of retentate that is recirculated can be adjusted via modulation of the pump or control valve as a way to tune the system in order to assure consistent retentate concentration and/or consistent retentate flow rate to the product collection vessel every run even if feedstock protein concentration, new membrane permeability, membrane fouling, membrane permeability, or membrane mass transfer or pressure drop varies from batch to batch. This strategy has particular benefits in the context of continuous processing, where the success of subsequent operations rely on the output of a previous operation. Recirculation of retentate can improve cleaning effectiveness through increased cross flow velocity and reduce cleaning solution through recirculation.

Typically, at least about 50% of the retentate is collected after a single pass, while the remainder of the retentate is recirculated. Preferably, about 10% or less (e.g., about 0.5%, about 1%, about 2%, about 5%, about 10%) of the retentate is recirculated after the first pass through the TFF system.

The retentate that is being recirculated can be returned to any upstream location in or before the TFF system. In one embodiment, the retentate is recirculated to the feed tank. In another embodiment, the retentate is recirculated to the feed line near the feed pump before the feed inlet on the TFF system.

In some embodiments, the methods described herein further comprise performing diafiltration (e.g., to remove or lower the concentration of salts or solvents in the liquid feed, or to accomplish buffer exchange). In a preferred embodiment, the diafiltration is performed by concentrating the liquid feed (e.g., by TFF) to reduce the diafiltration volume and then restoring the feed to its starting volume by adding diafiltration solution (e.g., diafiltration buffer), a process which is known in the art as discontinuous, or batch, diafiltration. In another embodiment, the diafiltration is performed by adding the diafiltrate solution to retentate to increase the diafiltration volume followed by concentrating the sample to restore it to its original volume. In yet another embodiment, the diafiltration is performed by adding the diafiltration solution to feed or feed recirculation tank at the same rate that permeate is removed from the TFF system, a process which is known in the art as continuous, or constant-volume, diafiltration. Suitable diafiltration solutions are well known and include, for example, water and various aqueous buffer solutions. To perform diafiltration, the TFF system can include a reservoir or container for diafiltration solution and one or more conduits for carrying diafiltration solution from the diafiltration solution container to the liquid feed tank.

To avoid extremes of concentration and in-line dilution as part of the diafiltration process (e.g. >90%), it is preferred to inject the diafiltrate into multiple sections of the filtration assembly to restore the flow in the retentate section to the same flow as in the initial feed. This requires matching the rate of diafiltrate buffer addition with the rate of permeate removal. A preferred method is to use a single pump with multiple pump heads containing the diafiltrate addition and permeate removal flow lines (e.g. Peristaltic pump from Ismatec (Glattbrugg Switzerland)). Each pump head will have closely-matched pumping rates so this process will be balanced and maintain efficient buffer exchange. It is recommended to match flows for each of the multiple sections by using pumps containing up to 24 channels. The diafiltrate can be injected into the retentate ports in manifolds or separator plates.

EXAMPLE

The leaf lengths and estimated productivity of three types of filter elements is shown in Table 1. A single-leaf spiral-wound filter element, a multi-leaf spiral-wound filter element, and a radial-path filter element are compared based on modeling data. All filter element designs are based on an 8" diameter filter element and inclusion of the same membrane and permeate spacer screen. Productivity for spiral wound filter element in mass transfer limited flux applications, was estimated using the permeate pressure drop equation for laminar permeate flow in a channel bounded by two adjacent membrane sheets:

$$dP_{perm} = mJL^2 \quad (1)$$

Where $dP_{perm}$ is the permeate channel pressure drop in pounds force per square inch, m is the permeate channel spacer pressure drop per cm of length per ml/min of flow per cm of width at the extant permeate viscosity, J is the mass transfer limited permeate flux in ml/min per square cm of membrane, and L is the length of the permeate discharge channel in cm.

The target performance of the filter elements in this Example is a mass transfer limited permeate flux of 120 LMH at the same permeate channel pressure drop, with permeate outlet pressure of zero.

TABLE 1

Productivity Comparison of Single-Leaf, Multi-leaf, and Radial-path Filter Elements

|  | Single-leaf | Multi-leaf | Radial-path |
| --- | --- | --- | --- |
| Number of Leaves | 1 | 30 | 1 |
| Leaf Length (inches) | 750 | 25 | 29 |
| Flux (LMH) | 0.21 | 192 | 143 |

As shown in Table 1, the single-leaf spiral element flux is negligible, at less than 1 LMH, due to the very long leaf. The multi-leaf and radial-path filter elements are able to meet the flux target with, respectively, 192 and 143 LMH, due to their shorter leaf lengths. However, the radial path spiral element requires only one leaf as compared with the thirty leaves of the multi-leaf filter element.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A filter element, comprising:
a single closed membrane structure wrapped about a core in reciprocating clockwise and counterclockwise directions forming semicircular folds of membrane about the core, the semicircular folds of membrane having opposingly situated apical ends separated by a gap, wherein the closed membrane structure has an interior portion defining at least one feed channel and an exterior portion defining at least one permeate channel, and an area defining a radial permeate discharge path, said radial permeate discharge path formed by the gap created by the opposingly situated ends of the semicircular folds of membrane and the core and/or a housing having one or more openings in fluid communication with the radial permeate discharge path.

2. The filter element of claim 1, further comprising a sealant applied to a first end and a second end of the filter element, the sealant preventing feed that is entering the filter element, retentate that is exiting the filter element, or a combination thereof, from entering the radial permeate discharge path and the at least one permeate channel.

3. The filter element of claim 2, wherein the sealant is a urethane, epoxy, glue, tape, or thermoplastic bonding material.

4. The filter element of claim 1, further comprising a feed spacer within the at least one feed channel.

5. The filter element of claim 1, wherein the closed membrane structure comprises one or more membrane sheets arranged in a closed loop.

6. The filter element of claim 1, further comprising a permeate spacer located within the radial permeate discharge path.

7. The filter element of claim 1, further comprising a radial path support located within the radial permeate discharge path.

8. The filter element of claim 1, further comprising a permeate spacer located within the at least one permeate channel.

9. The filter element of claim 1, further comprising a permeate collection tube disposed within the core.

10. The filter element of claim 1 wherein the wound closed membrane structure is disposed within a housing, a sleeve, or a liner.

11. The filter element of claim 1, wherein the closed membrane structure comprises at least one ultrafiltration membrane.

12. The filter element of claim 1, wherein the closed membrane structure comprises at least one microfiltration membrane.

13. The filter element of claim 1, wherein the closed membrane structure comprises at least one nanofiltration membrane.

14. A tangential flow filtration (TFF) system comprising the filter element of claim 1.

15. The TFF system of claim 14, wherein the TFF system is a single pass system.

16. A method of filtering a liquid feed, comprising:
providing the filter element of claim 1; and
introducing a liquid feed to the at least one feed channel of the filter element, the liquid feed travelling through a flowpath defined by the closed membrane structure, the liquid feed separating into permeate and retentate as the feed passes through the filter element, the permeate arriving at the radial permeate discharge path, thereby filtering the liquid feed.

17. The method of claim 16, further comprising recovering the permeate and at least a portion of the retentate from the filter element.

18. The filter element of claim 1, wherein the at least one feed channel and the at least one permeate channel are isolated from each other.

19. The filter element of claim 1, wherein the core has one or more openings in fluid communication with the radial permeate discharge path.

20. The filter element of claim 1, wherein the housing has one or more openings in fluid communication with the radial permeate discharge path.

* * * * *